United States Patent
Pilon

(10) Patent No.: US 12,313,896 B2
(45) Date of Patent: May 27, 2025

(54) TRAY MEANS FOR PROVIDING A PLURALITY OF DIFFERENT MODULAR CASSETTE CONFIGURATIONS IN A FIBER OPTIC MANAGEMENT SYSTEM

(71) Applicant: BELDEN CANADA ULC, Saint-Laurent (CA)

(72) Inventor: Vincent Pilon, Lachine (CA)

(73) Assignee: Belden Canada ULC, Saint-Laurent (CA)

( * ) Notice: Subject to any disclaimer, the term of this patent is extended or adjusted under 35 U.S.C. 154(b) by 0 days.

(21) Appl. No.: 18/328,431

(22) Filed: Jun. 2, 2023

(65) Prior Publication Data

US 2023/0305255 A1 Sep. 28, 2023

Related U.S. Application Data

(63) Continuation of application No. 18/105,639, filed on Feb. 3, 2023, now Pat. No. 11,740,423, which is a
(Continued)

(51) Int. Cl.
G02B 6/44 (2006.01)

(52) U.S. Cl.
CPC ....... *G02B 6/4455* (2013.01); *G02B 6/44526* (2023.05)

(58) Field of Classification Search
CPC .................. G02B 6/4452; G02B 6/44526
See application file for complete search history.

(56) References Cited

U.S. PATENT DOCUMENTS 4,792,203 A 12/1988 Nelson et al.
7,331,722 B2 2/2008 Tan
(Continued)

FOREIGN PATENT DOCUMENTS

NL 2008155 C2 7/2013
WO 2010148325 A1 12/2010

OTHER PUBLICATIONS

Inter Partes Review Case IPR2024-01218—U.S. Pat. No. 10,795,107 (Claims 1-5 and 8-13), Decision—Granting Institution of Inter Partes Review, Paper 9, Feb. 27, 2025, 25 pages.
(Continued)

*Primary Examiner* — Rhonda S Peace
(74) *Attorney, Agent, or Firm* — MH2 Technology Law Group, LLP

(57) ABSTRACT

A tray means for providing a plurality of different modular fiber optic cassette configurations that may comprise a tray member that may support a plurality of different modular fiber optic cassette configurations in a standard U-space width. The different modular fiber optic cassette configurations may include different sizes of modular fiber optic cassettes. Each of the different sizes of modular fiber optic cassettes may support a fiber optic receptable module that may fit in a standard one width (1W) unit. The plurality of different sizes of modular fiber optic cassettes may include a 2W cassette size that may fit a standard two width (2W) unit (relative to the standard one width, (1W) unit), a 3W cassette size that may fit a standard three width (3W) unit, a 4W cassette size that may fit a standard four width (4W) unit, and/or a 6W cassette size that may fit a standard six width (6W) unit.

121 Claims, 13 Drawing Sheets

Related U.S. Application Data continuation of application No. 17/929,566, filed on Sep. 2, 2022, now Pat. No. 11,656,422, which is a continuation of application No. 17/010,113, filed on Sep. 2, 2020, now Pat. No. 11,435,542, which is a continuation of application No. 16/143,831, filed on Sep. 27, 2018, now Pat. No. 10,795,107.

(60) Provisional application No. 62/567,339, filed on Oct. 3, 2017.

(56) References Cited

U.S. PATENT DOCUMENTS

| | | | |
|---|---|---|---|
| 7,509,015 B2 | 5/2009 | Murano | |
| 8,712,206 B2* | 4/2014 | Cooke | G02B 6/4455 385/134 |
| 8,873,922 B2 | 10/2014 | Kowalczyk et al. | |
| 8,913,866 B2 | 12/2014 | Cote et al. | |
| 9,008,485 B2 | 4/2015 | Ramirez et al. | |
| 9,075,216 B2 | 7/2015 | Cote et al. | |
| 9,250,409 B2 | 2/2016 | Blackwell, Jr. et al. | |
| 9,690,064 B2 | 6/2017 | Sauter et al. | |
| 9,690,065 B2 | 6/2017 | Wiltjer et al. | |
| 9,885,845 B2 | 2/2018 | Case | |
| 10,042,135 B2 | 8/2018 | Murray et al. | |
| 10,101,551 B2* | 10/2018 | Fukui | G02B 6/44528 |
| 10,215,944 B2 | 2/2019 | Sedor et al. | |
| 10,281,672 B1 | 5/2019 | Mullsteff | |
| 10,359,595 B2 | 7/2019 | Aramayo et al. | |
| 10,514,518 B1 | 12/2019 | Livingston et al. | |
| 10,598,884 B2 | 3/2020 | Fontaine et al. | |
| 10,656,359 B2 | 5/2020 | Fontaine et al. | |
| 10,670,822 B2 | 6/2020 | Vogel | |
| 10,768,387 B2 | 9/2020 | Pilon et al. | |
| 10,795,107 B2 | 10/2020 | Pilon | |
| 10,809,479 B2 | 10/2020 | Crawford et al. | |
| 11,187,864 B2 | 11/2021 | Crawford et al. | |
| 11,333,842 B2 | 5/2022 | Ma et al. | |
| 11,435,542 B2 | 9/2022 | Pilon | |
| 11,656,422 B2* | 5/2023 | Pilon | G02B 6/4455 385/135 |
| 11,740,423 B2* | 8/2023 | Pilon | G02B 6/4455 385/135 |
| 2002/0131730 A1 | 9/2002 | Keeble et al. | |
| 2006/0261015 A1 | 11/2006 | Blackwell | |
| 2007/0131628 A1 | 6/2007 | Mimlitch | |
| 2007/0146997 A1 | 6/2007 | Foster, Sr. | |
| 2008/0298014 A1 | 12/2008 | Franco | |
| 2009/0290842 A1 | 11/2009 | Bran de Leon et al. | |
| 2014/0099064 A1 | 4/2014 | Fabrykowski et al. | |
| 2016/0011383 A1* | 1/2016 | Lee | G02B 6/3897 385/75 |
| 2016/0033732 A1 | 2/2016 | Giraud et al. | |
| 2016/0062050 A1 | 3/2016 | Giraud et al. | |
| 2016/0062055 A1 | 3/2016 | Giraud et al. | |
| 2016/0062058 A1 | 3/2016 | Dagley et al. | |
| 2016/0062068 A1 | 3/2016 | Giraud et al. | |
| 2016/0231525 A1* | 8/2016 | Murray | G02B 6/44526 |
| 2017/0153406 A1 | 6/2017 | Rodriguez | |
| 2017/0192191 A1* | 7/2017 | Dagley | G02B 6/44528 |
| 2017/0359091 A1* | 12/2017 | Fukui | G02B 6/44526 |
| 2018/0003912 A1 | 1/2018 | Sedor et al. | |
| 2019/0004268 A1 | 1/2019 | Vogel | |
| 2019/0101717 A1 | 4/2019 | Pilon | |
| 2019/0107682 A1 | 4/2019 | Aramayo et al. | |
| 2019/0162924 A1 | 5/2019 | Fontaine et al. | |
| 2019/0187394 A1 | 6/2019 | Fontaine et al. | |
| 2023/0305255 A1* | 9/2023 | Pilon | G02B 6/4455 |
| 2023/0384549 A1* | 11/2023 | Pilon | G02B 6/4455 |

OTHER PUBLICATIONS

Inter Partes Review Case IPR2024-01227—U.S. Pat. No. 11,435,542 (Claims 1-5 and 8-13), Decision—Granting Institution of Inter Partes Review, Paper 9, Feb. 27, 2025, 35 pages.

Inter Partes Review Case IPR2024-01228—U.S. Pat. No. 11,656,422 (Claims 1-6, 10-14, 16, 18, 20-28, 32-36, 38, 40-42, 44-56, 60-62, and 64), Decision—Granting Institution of Inter Partes Review, Paper 9, Feb. 27, 2025, 33 pages.

Inter Partes Review Case IPR2024-01382—U.S. Pat. No. 11,740,423 (Claims 1-30), Decision—Granting Institution of Inter Partes Review, Paper 9, Feb. 27, 2025, 28 pages.

Inter Partes Review Case IPR2024-01218—U.S. Pat. No. 10,795,107, Patent Owner's Preliminary Response, Dec. 2, 2024, 43 pages.

Inter Partes Review Case IPR2024-01227—U.S. Pat. No. 11,435,542, Patent Owner's Preliminary Response, Dec. 2, 2024, 37 pages.

Inter Partes Review Case IPR2024-01228—U.S. Pat. No. 11,656,422, Patent Owner's Preliminary Response, Dec. 2, 2024, 38 pages.

Inter Partes Review Case IPR2024-01382—U.S. Pat. No. 11,740,423, Patent Owner's Preliminary Response, Jan. 9, 2025, 43 pages.

Inter Partes Review Case IPR2024-01218—U.S. Pat. No. 10,795,107, Petition For Inter Partes Review (Claims 1-5 and 8-13), Paper 1, Jul. 26, 2024, 154 pages.

Inter Partes Review Case IPR2024-01227—U.S. Pat. No. 11,435,542, Petition For Inter Partes Review (Claims 1-5 and 8-13), Paper 1, Jul. 26, 2024, 154 pages.

Inter Partes Review Case IPR2024-01228—U.S. Pat. No. 11,656,422, Petition For Inter Partes Review (Claims 1-6, 10-14, 16, 18, 20-28, 32-36, 38, 40-42, 44-56, 60-62, and 64), Paper 1, Jul. 26, 2024, 177 pages.

Inter Partes Review Case IPR2024-01382—U.S. Pat. No. 11,740,423, Petition For Inter Partes Review (Claims 1-30), Paper 1, Aug. 30, 2024, 173 pages.

*Belden Canada ULC v. CommScope, Inc et al.*, U.S. District Court for the District of Delaware, C.A. No. 23-810-RGA, "Belden's Opening Claim Constructions Brief," Jul. 19, 2024, 26 pages.

*Belden Canada ULC v. CommScope, Inc et al.*, U.S. District Court for the District of Delaware, C.A. No. 23-810-RGA, "CommScope's Answering Claim Construction Brief," Aug. 23, 2024, 37 pages.

*Belden Canada ULC v. CommScope, Inc et al.*, U.S. District Court for the District of Delaware, C.A. No. 23-810-RGA, Joint Claim Construction Chart, Case 1:23-cv-00810-RGA, Document 56, Filed Jun. 21, 2024, 30 pages.

"EIA Standard, Cabinets, Racks, Panels, and Associated Equipment," EIA/ECA-310-E, Electronic Components Industry Association, Dec. 2005, 27 pages.

International Standard IEC 61754-20, "Fibre optic interconnecting devices and passive components—Fibre optic connector interfaces—Part 20: Type LC connector family," International Electrotechnical Commission, 2012, 58 pages.

"Commscope User Manual, TC-96307-IP, Rev A, Propel Panel" Commscope.com, Commscope Inc., Mar. 2022, 34 pages.

"Edge HD Solutions, Edge™ HD Solutions for Enterprise Data Centers and Storage Area Networks," Corning Optical Communications LLC, 2015, 18 pages.

"Fiber Systems: Enclosure and Panel Selection Guide," Leviton Network Solutions, 16 pages. (Need Date).

"HD Flex Fiber Cabling System, No Limits: The Power of Innovation Serviceability and Manageability for the Next-Generation Data Center," Panduit Corp., 2016, 12 pages.

Screen Capture, Propel Installation, Youtube.com, https://www.youtube.com/watch?v=_agZJP5tZWc at 1:55, Commscope, 2021, 1 page.

\* cited by examiner

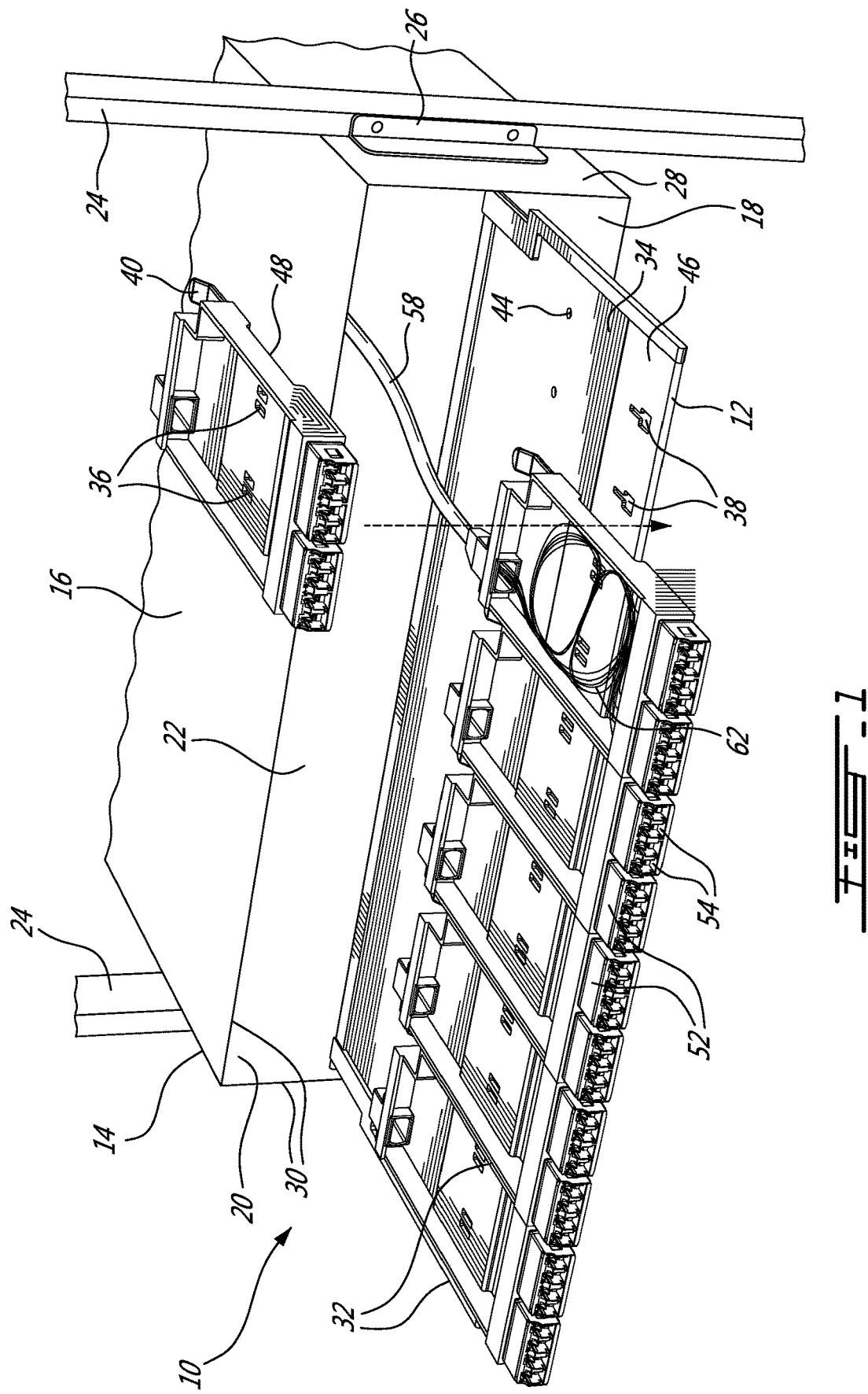

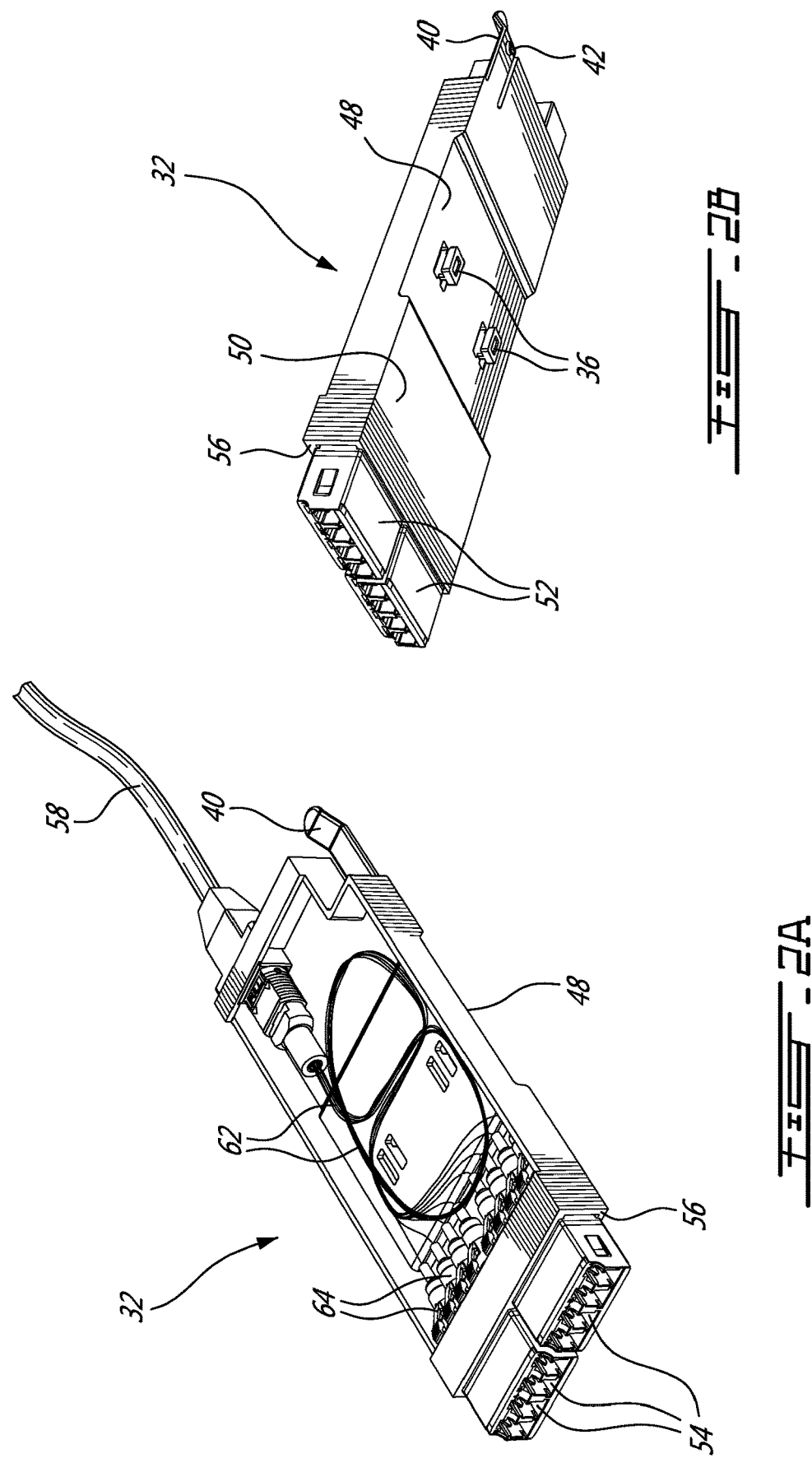

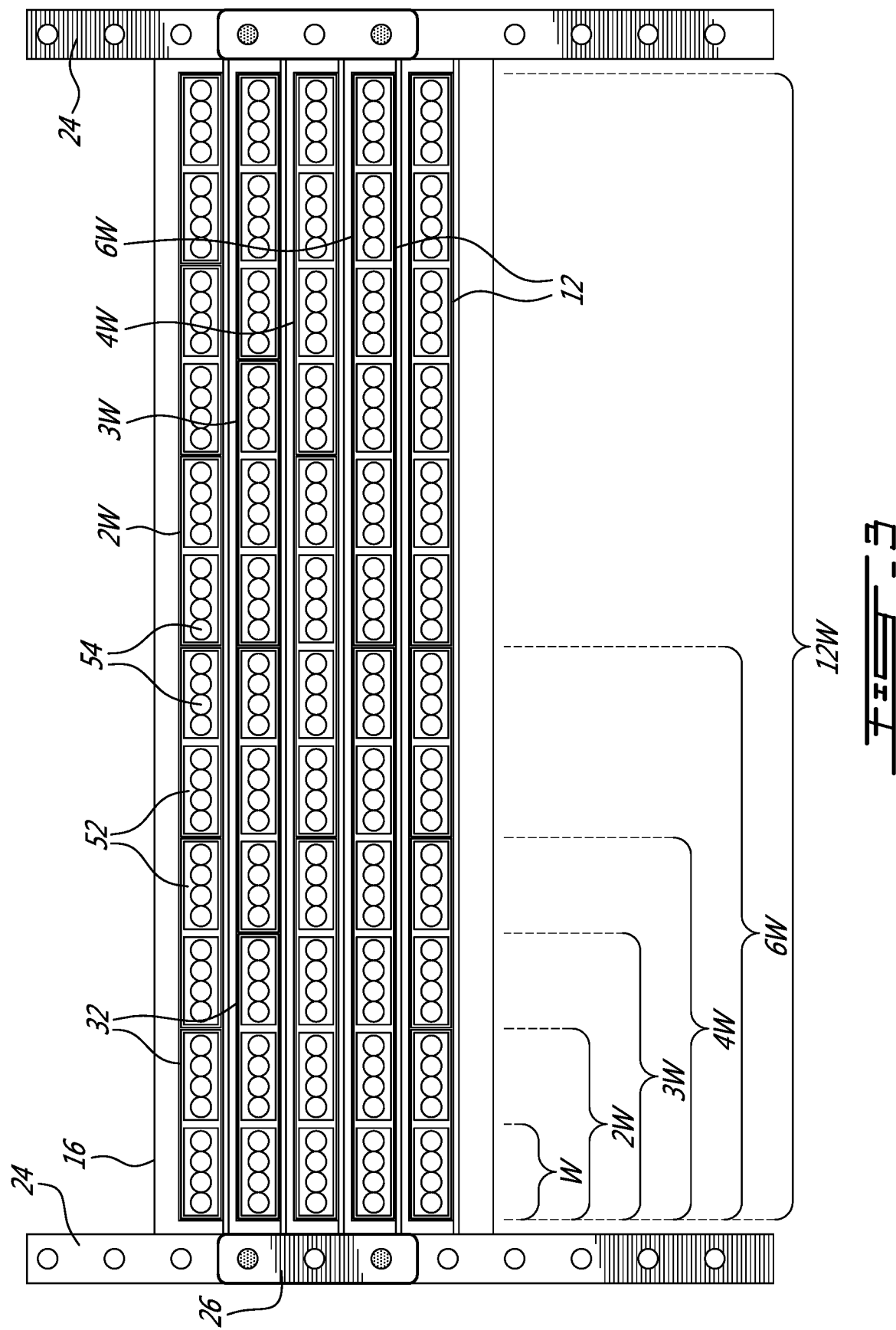

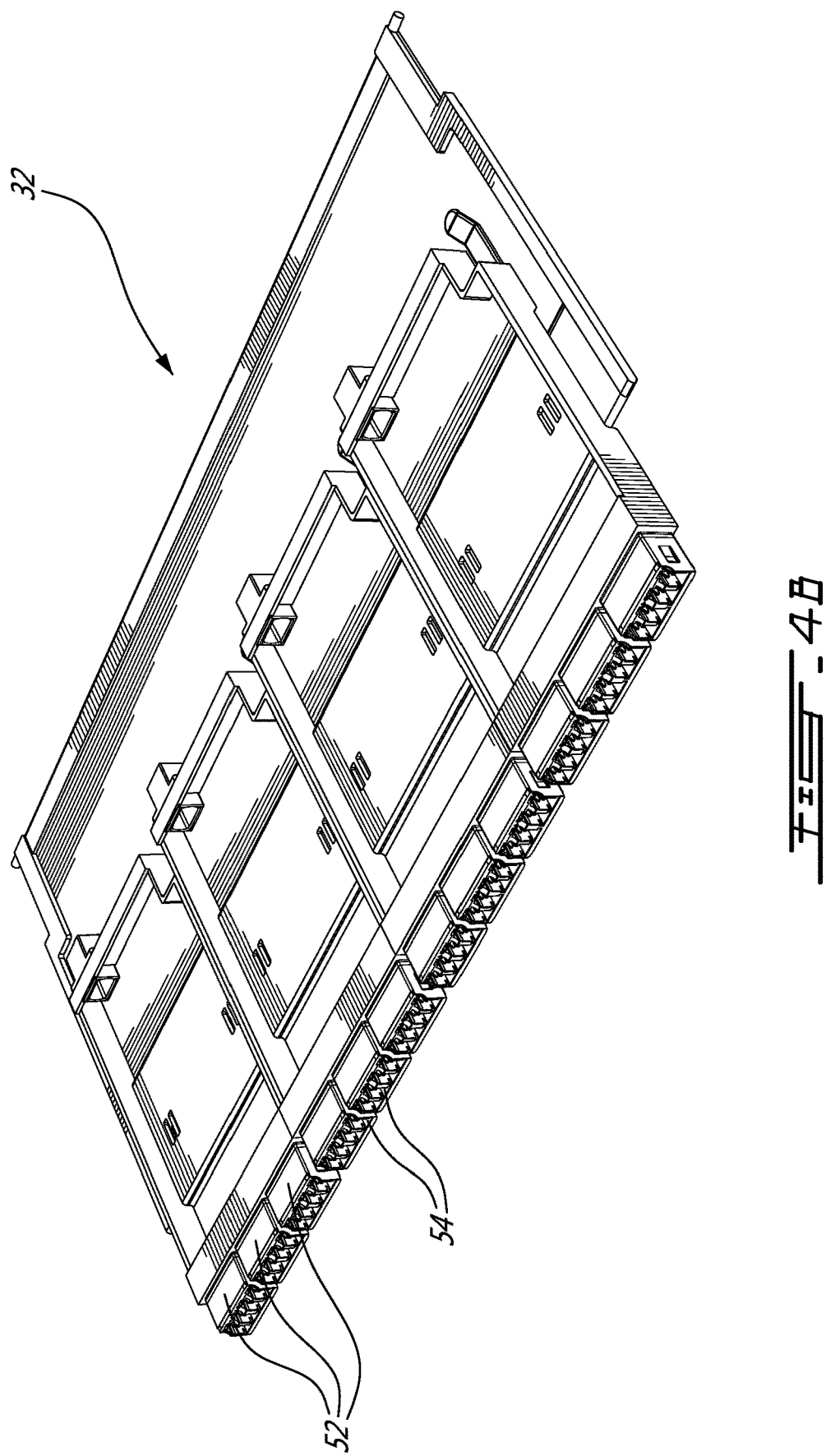

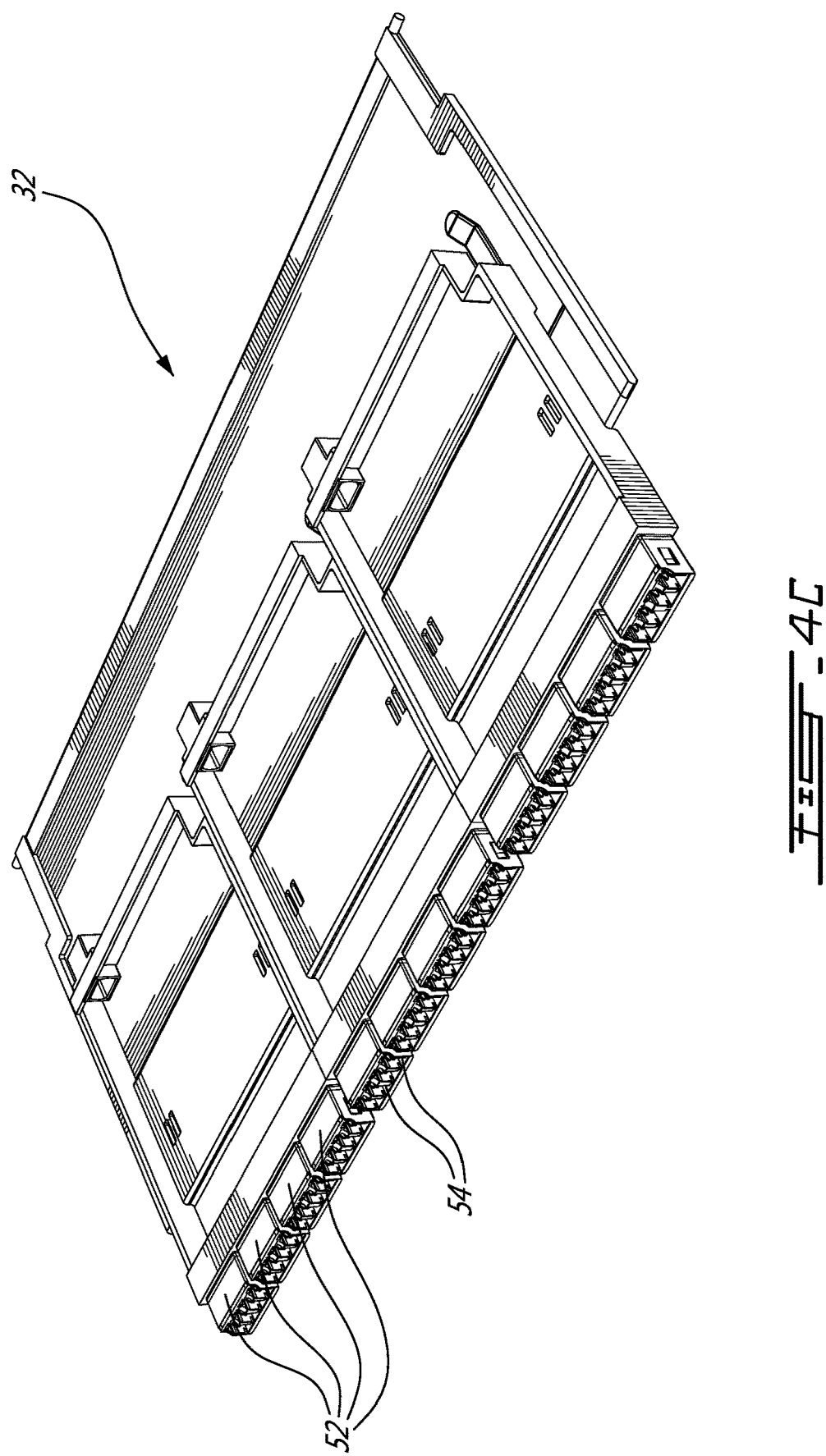

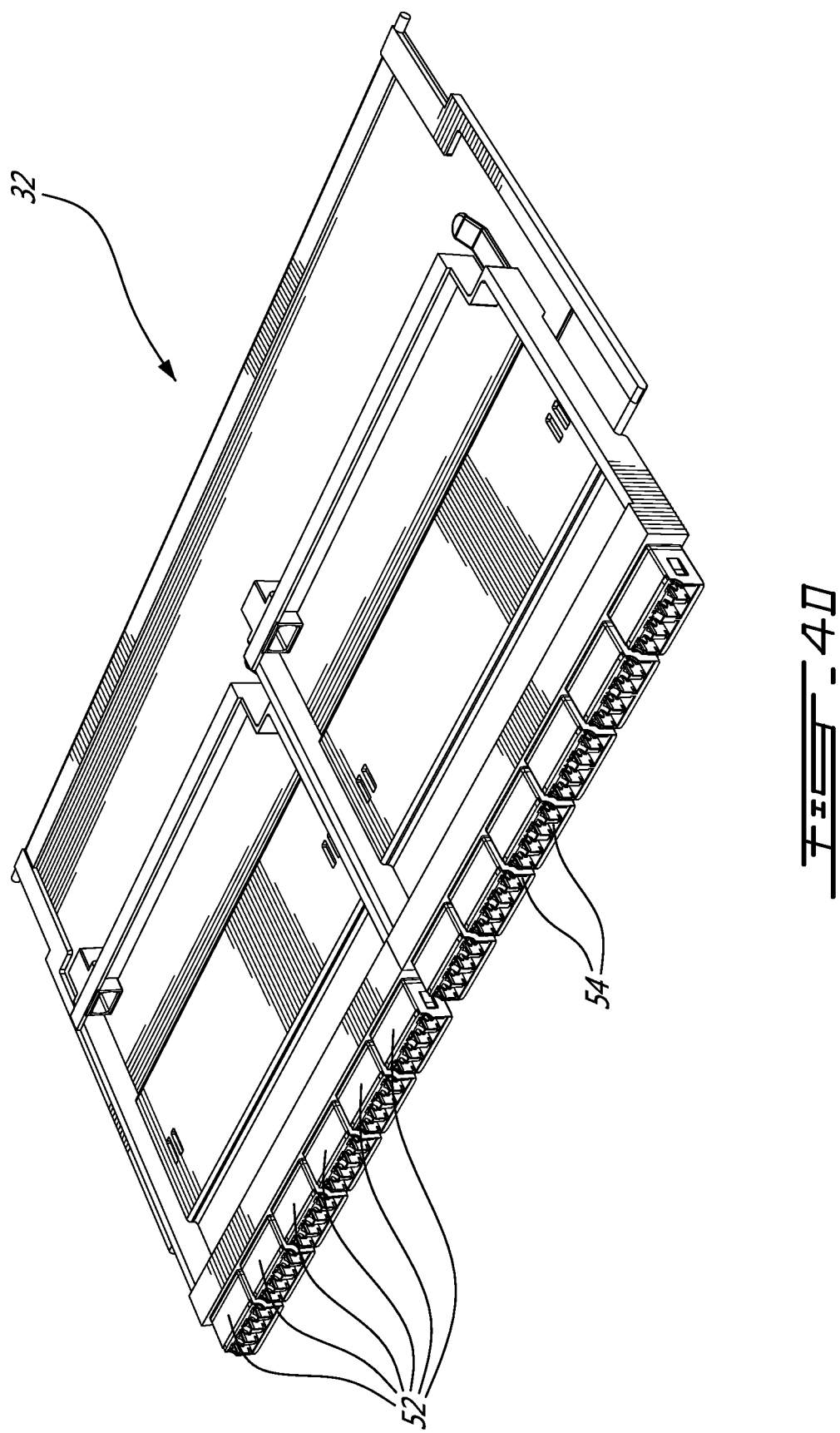

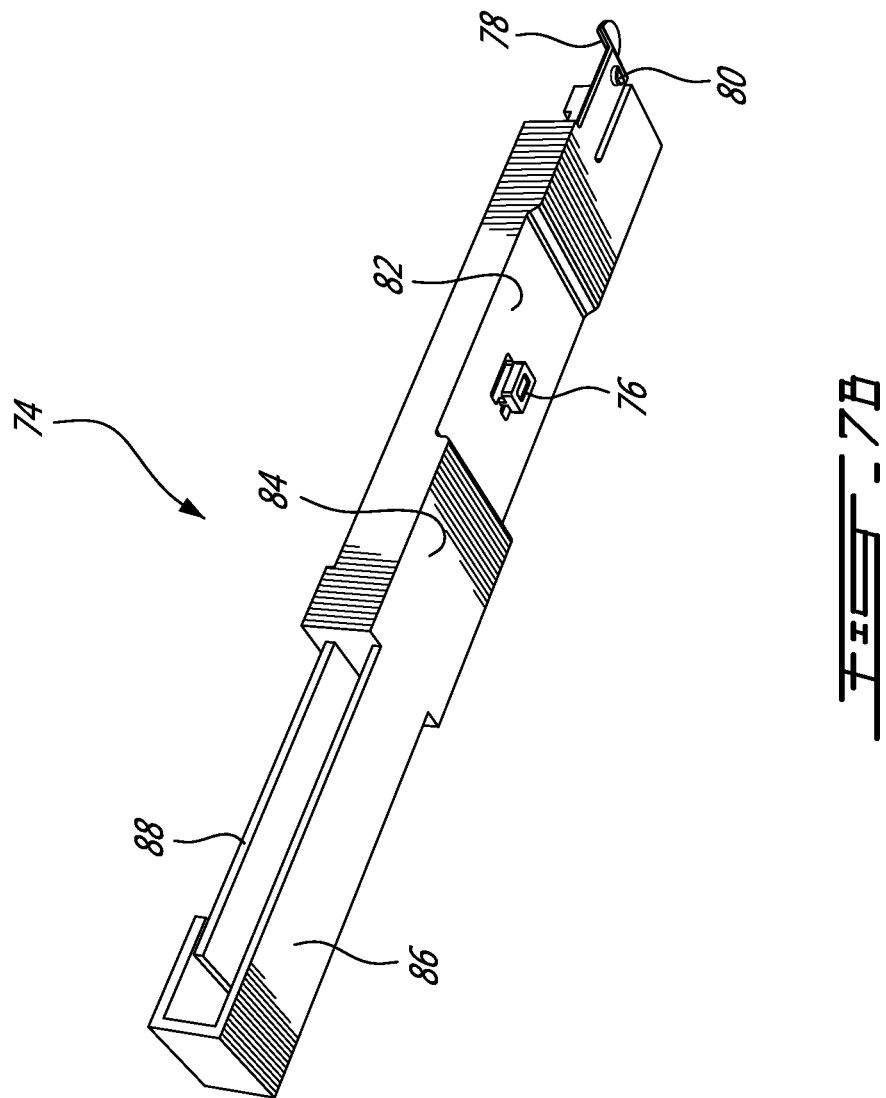

TRAY MEANS FOR PROVIDING A PLURALITY OF DIFFERENT MODULAR CASSETTE CONFIGURATIONS IN A FIBER OPTIC MANAGEMENT SYSTEM

CROSS REFERENCE TO RELATED APPLICATIONS

This application is a continuation application of U.S. patent application Ser. No. 18/105,634 filed on Feb. 3, 2023, which is in turn a continuation application of U.S. patent application Ser. No. 17/929,566 filed on Sep. 2, 2022, now U.S. Pat. No. 11,656,422, which is in turn a continuation application of U.S. patent application Ser. No. 17/010,113 filed on Sep. 2, 2020, now U.S. Pat. No. 11,435,542, which is in turn a continuation application of U.S. patent application Ser. No. 16/143,831 filed on Sep. 27, 2018, now U.S. Pat. No. 10,795,107, which in turn claims priority under 35 USC § 119(e) of U.S. provisional application Ser. No. 62/567,339 filed on Oct. 3, 2017. All the above documents are incorporated herein in their entirety by reference.

FIELD OF THE INVENTION

The present invention relates to a tray means for providing modular cassette configurations in a fiber optic management system. In particular, the present invention relates to a tray for providing a plurality of modular cassette configurations in a fiber optic management system that may include a fiber optic cassette comprising a width of one or more standard width units such that fiber optic cassettes of different widths can be arranged on the same tray while optimizing the use of tray space.

BACKGROUND OF THE INVENTION

The prior art discloses fiber optic cassettes or splice boxes for use in terminating fiber optic trunk cables and splitting them out to patch cables which are removeably arranged on tray systems within a rack mounted case. One drawback of these cassettes and tray systems is that they are typically preconfigured to terminate fiber optic cables comprising a single predetermined number of optic fibers. Another drawback is that cassettes which are used to terminate fiber optic cables comprising different numbers of optic fibers are generally incompatible with one another and additionally require trays with different spacing, securing mechanisms and the like.

SUMMARY OF THE INVENTION

According to various exemplary embodiments of the disclosure, a tray for providing a plurality of different modular fiber optic cassette configurations in a standard U-space fiber optic management system may comprise a tray means having a first tray side end portion and a second tray side end portion defining a tray width portion of a standard U-space fiber management system. The tray width portion may extend between the first tray side end portion and the second tray side end portion. The tray width portion may be configured to fit a standard U-space width dimension. The tray means may be for fitting a plurality of different modular fiber optic cassette configurations in the tray width portion of the standard U-space fiber management system. Each of the plurality of different modular fiber optic cassette configurations may include a modular fiber optic cassette means for supporting a receptable module having a first module side end portion and a second module side end portion defining a module width portion extending between the first tray end portion and second tray end portion. The module width portion may be configured to fit in a standard one width (1W) unit. The modular fiber optic cassette means may include a first cassette side end portion and a second cassette side end portion defining a standard cassette width unit extending between the first cassette side end portion and the second cassette side end portion that may comprise a standard two width (2W) unit, a standard three width (3W) unit, a standard four width (4W) unit, or a standard a standard six width (6W) unit relative to the standard one width (1W) unit. The receptable module may be configured to fit at least four fiber optic plug receiving receptacle portions in a standard one width (1W) unit. The plurality of different modular fiber optic cassette configurations may comprise a first modular fiber optic cassette configuration that may include six modular two standard width unit (2W) cassettes that are each arranged side by side of each other along the tray such that a cassette side end portion of each modular two standard width (2W) cassette adjacently faces a cassette side end portion of at least one other modular two standard width (2W) cassette, a second modular fiber optic cassette configuration that may include four modular three standard width unit (3W) cassettes that are each arranged side by side of each other in a row along the tray such that a cassette side end portion of each modular three standard width (3W) cassette adjacently faces a cassette side end portion of at least one other modular three standard width (3W) cassette. A third modular fiber optic cassette configuration that may include three modular four standard width unit (4W) cassettes that are each arranged side by side of each other in a row along the tray such that a cassette side end portion of each modular four standard width (4W) cassette adjacently faces a cassette side end portion of at least one other modular four standard width (4W) cassette, and a fourth modular fiber optic cassette configuration that may include two modular six standard width unit (6W) cassettes that are each arranged side by side of each other in a row along the tray such that a cassette side end portion of one of the two modular six standard width (6W) cassettes adjacently faces a cassette side end portion of the other modular six standard width (6W) cassette. Each modular two standard width (2W) cassette may be configured to fit two receptacle modules. Each modular three standard width (3W) cassette may be configured to fit three receptacle modules. Each modular four standard width (4W) cassette may be configured to fit four receptacle modules. Each modular six standard width (6W) cassette may include to fit six receptacle modules. The tray means may be configured to be removable secured to the modular fiber optic cassette means when the tray fits the plurality of different modular fiber optic cassette configurations within the tray width portion in the standard U-space fiber management system. The tray means may include a plurality of cassette engaging portions that are configured to conform to the standard one width (1W) so as to support the modular two standard width (2W) cassette, the modular three standard width (3W) cassette, the modular four standard width (4W) cassette, and the modular six standard width (6W) cassette.

In some exemplary and non-limiting aspects, the tray means may comprise a tray member that may be configured to fit the plurality of different modular fiber optic cassette configurations in the tray width portion of the standard U-space fiber management system.

In some exemplary and non-limiting aspects, the plurality of different modular fiber optic cassette configurations may further comprise a fifth modular fiber optic cassette configuration that may include three modular two standard width unit (2W) cassettes that each may be arranged side by side of each other in a row along the tray such that a cassette side end portion of one of the three modular two standard width (2W) cassettes adjacently faces a cassette side end portion of one of the other modular two standard width (2W) cassette, and one modular six standard width unit (6W) cassette that may be arranged side by side in a row along the tray with one of the three modular two standard width unit (2W) cassettes, such that a cassette side end portion of the one modular six standard width unit (6W) cassette adjacently faces a cassette side end portion of one of the other three modular two standard width unit (2W) cassettes.

According to some aspects, the standard one width (1W) unit may be based on a standard LC Quad width unit that may be configured to fit four optical fiber connectors. In some aspects, the standard one width (1W) unit may be based on a standard SC Duplex width unit that may be configured to fit four optical fiber connectors. In some aspects, the standard one width (1W) unit may be based on a standard SC Duplex width unit that may be configured to fit an plurality of different type of LC, SC, and MPO connectors.

According to some aspects, the plurality of cassette engaging portions of the tray are spaced apart from one another so as to conform to the standard one width (1W) and support the modular two standard width (2W) cassette, the modular three standard width (3W) cassette, the modular four standard width (4W) cassette, and the modular six standard width (6W) cassette.

According to some aspects, the tray means may include a cassette engaging shoulder that may be configured to fit a channel portion of the modular cassette means. In some aspects, the cassette engaging shoulder is located adjacent to a front end portion of the tray means such that the tray means may be configured to support the modular cassette means at a front location of the tray means.

According to some aspects, the tray means may be configured to be slideably received in at least portion of a tray receiving space of a case of a fiber optic management system.

According to some aspects, the modular fiber optic cassette means may comprise a plurality of modular fiber optic cassette means that include a cassette side end portion that is directly adjacent to a cassette side end portion of another module fiber optic cassette means when each of the plurality of modular fiber optic cassettes means are in the plurality of the plurality of different modular fiber optic cassette configurations.

According to some aspects, the modular fiber optic cassette means may comprise a plurality of modular fiber optic cassette means that may include a cassette side end portion of one modular fiber optic cassette means that may be located adjacent to a cassette side end portion of another module fiber optic cassette when each of the plurality of modular fiber optic cassette means are in the plurality of the plurality of different modular fiber optic cassette configurations.

According to some aspects, the modular fiber optic cassettes means may comprise a plurality of modular fiber optic cassette means that include a cassette side end portion of one modular fiber optic cassette means that touches a cassette side end portion of another module fiber optic cassette when each of the modular fiber optic cassettes means are in the plurality of the plurality of different modular fiber optic cassette configurations. In some aspects the modular fiber optic cassette means may comprise a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

According to some aspects, the tray means has a tray width that may be configured to receive at least twelve standard one width (1W) units side by side along a row. In some aspects the modular fiber optic cassette means may comprise four fiber optic plug receiving receptacle portions configured to be arranged side by side in a row along a front portion thereof for each standard width (1W) unit.

According to some aspects, the tray means may include a first tray end portion, a second tray end portion spaced away from the first tray end portion so as to define a tray width extending between the first tray end portion and the second tray end portion, and the tray width may be configured to fit at least twelve standard one width (1W) units side by side along the tray means.

According to some aspects, the tray means may be configured to be mounted in a rack. In some aspects, the tray means may be configured to be mounted in a standard U-space rack.

In some exemplary and non-limiting aspects, the tray means may comprise a cassette fastening portion that may be configured to removably secure the tray to the modular cassette means. In some aspects the cassette fastening portion may comprise a magnet.

In some exemplary and non-limiting aspects, the tray means may be configured to be removable secured to an elongate cable management bracket that may include a bracket width that fits in the standard one width (1W) unit. In some exemplary and non-limiting aspects, the elongate cable management bracket may include a cable management loop that may be configured to be positioned in front of and to a side of an optic plug receiving receptacle portion of a modular cassette when the cable management loop is removably secured to the tray.

According to some aspects, the tray means may include a plurality of cassette engaging tray portions that are each configured to engage a tray engaging cassette portion of each modular fiber optic cassette.

In accordance with various exemplary and non-limiting embodiments of the disclosure, a tray for providing a plurality of different modular fiber optic cassette configurations in a fiber optic management system that may comprise a tray means for fitting a plurality of different modular fiber optic cassette configurations in a standard U-space. Each of the plurality of different modular fiber optic cassette configurations may include a plurality of different sizes of modular fiber optic cassettes. Each of the plurality of different sizes of modular fiber optic cassettes may be configured to support a fiber optic receptable module that may be configured to fit in a standard one width (1W) unit. The plurality of different sizes of modular fiber optic cassettes include a 2W cassette size that may be configured to fit a standard two width (2W) unit relative to the standard one width (1W) unit, a 3W cassette size that may be configured to fit a standard three width (3W) unit relative to the standard one width (1W) unit, a 4W cassette size that may be configured to fit a standard four width (4W) unit relative to the standard one width (1W) unit, and a 6W cassette size that may be configured to fit a standard six width (6W) unit relative to the standard one width (1W) unit. The plurality of different modular fiber optic cassette configurations may comprise a first modular fiber optic cassette configuration that may include six modular 2W standard width unit size cassettes that are each arranged side by side of each other along the tray such that a cassette side end portion of each modular 2W standard width unit size cassette adjacently faces a cassette side end portion of at least one other modular 2W standard width size cassette, a second modular fiber optic cassette configuration that may include four modular 3W standard width unit size cassettes that are each arranged side by side of each other in a row along the tray such that a cassette side end portion of each modular 3W standard width size cassette adjacently faces a cassette side end portion of at least one other modular 3W standard width size cassette, a third modular fiber optic cassette configuration that may include three modular 4W standard width unit size cassettes that are each arranged side by side of each other in a row along the tray such that a cassette side end portion of each modular 4W standard width size cassette adjacently faces a cassette side end portion of at least one other modular 4W standard width size cassette and a fourth modular fiber optic cassette configuration that may include two modular 6W standard width unit size cassettes that are each arranged side by side of each other in a row along the tray such that a cassette side end portion of one of the two modular 6W standard width size cassettes adjacently faces a cassette side end portion of the other modular 6W standard width size cassette. The tray means may be configured to be removable secured to each modular fiber optic cassette when the tray means fits the plurality of different modular fiber optic cassette configurations within a tray width portion in the standard U-space fiber optic management system. The tray means may include a plurality of cassette engaging portions that are configured to conform to the standard one width (1W) so as to support the modular 2W standard width unit size cassette, the modular 3W standard width unit size cassette, the modular 4W standard width unit size cassette, and the modular 6W standard width unit size cassette.

In some exemplary and non-limiting aspects, the tray means may include a first tray side end portion and a second tray side end portion defining a tray width portion extending between the first tray side end portion and the second tray side end portion. In some aspects the tray width portion may be configured to fit in a standard U-space width dimension.

In some exemplary and non-limiting aspects, the fiber optic receptable module may include a first module side end portion and a second module side end portion defining a module width portion extending between the first try end portion and second tray end portion, and the module width portion may be configured to fit in the standard one width (1 W) unit.

In some exemplary and non-limiting aspects, the modular 2W standard width unit size cassette may include a first 2W cassette side end portion and a second 2W cassette side end portion defining a 2W standard cassette width unit extending between the first cassette side end portion and the second cassette side end portion that may be configured to fit the standard two width (2W) unit.

In some exemplary and non-limiting aspects, the modular 3W standard width unit size cassette may include a first 3W cassette side end portion and a second 3W cassette side end portion defining a 3W standard cassette width unit extending between the first 3W cassette side end portion and the second 3W cassette side end portion that may be configured to fit the standard three width (3W) unit.

In some exemplary and non-limiting aspects, modular 4W standard width unit size cassette may include a first 4W cassette side end portion and a second 4W cassette side end portion defining a 4W standard cassette width unit extending between the first 4W cassette side end portion and the second 4W cassette side end portion that may be configured to fit the standard four width (4W) unit.

In some exemplary and non-limiting aspects, the modular 6W standard width unit size cassette may include a first 6W cassette side end portion and a second 6W cassette side end portion defining a 6W standard cassette width unit extending between the first 6W cassette side end portion and the second 6W cassette side end portion that may be configured to fit the standard six width (6W) unit.

In some exemplary and non-limiting aspects, the modular 2W standard width unit size cassette may be configured to fit two receptacle modules. In some aspects, the modular 3W standard width unit size cassette may be configured to fit three receptacle modules. In some aspects, the modular 4W standard width unit size cassette may be configured to fit four receptacle modules. In some aspects, the modular 6W standard width unit size cassette may be configured to fit six receptacle modules.

In some aspects, the fiber optic receptable module may be configured to fit at least four fiber optic plug receiving receptacle portions.

In some aspects, the fiber optic receptable module may be configured to fit at least four fiber optic plug receiving receptacle portions in the standard one width (1W) unit.

In some exemplary and non-limiting aspects, the standard one width (1W) unit is based on a standard LC Quad width unit that may be configured to fit four optical fiber connectors.

In some exemplary and non-limiting aspects, the standard one width (1W) unit is based on a standard SC Duplex width unit that may be configured to fit four optical fiber connectors.

In some exemplary and non-limiting aspects, the standard one width (1W) unit is based on a standard SC Duplex width unit that may be configured to fit an plurality of different type of LC, SC, and MPO connectors.

In some exemplary and non-limiting aspects, the plurality of cassette engaging portions of the tray means are spaced apart from one another so as to conform to the standard one width (1W) and support the modular 2W standard width unit size cassette, the modular 3W standard width unit size cassette, the modular 4W standard width unit size cassette, and the modular 6W standard width unit size cassette.

In some exemplary and non-limiting aspects, the tray means may include a cassette engaging shoulder that may be configured to fit a channel portion of each of the modular cassettes. In some aspects, the cassette engaging shoulder is located adjacent to a front end portion of the tray means such that the tray means may be configured to support each of the modular cassettes at a front location of the tray.

In some exemplary and non-limiting aspects, the tray means may be configured to be slideably received in at least portion of a tray receiving space of a case of a fiber optic management system.

In some exemplary and non-limiting aspects, each of the modular fiber optic cassettes include a cassette side end portion that is directly adjacent to a cassette side end portion of another module fiber optic cassette when each of the modular fiber optic cassettes are in the plurality of the plurality of different modular fiber optic cassette configurations.

In some exemplary and non-limiting aspects, each of the modular fiber optic cassettes include a cassette side end portion that is adjacent to a cassette side end portion of another module fiber optic cassette when each of the modular fiber optic cassettes are in the plurality of the plurality of different modular fiber optic cassette configurations.

In some exemplary and non-limiting aspects, each of the modular fiber optic cassettes include a cassette side end portion that may be configured to touch a cassette side end portion of another module fiber optic cassette when each of the modular fiber optic cassettes are in the plurality of the plurality of different modular fiber optic cassette configurations.

In some exemplary and non-limiting aspects, the tray means may have a tray width that may be configured to receive at least twelve standard one width (1W) units side by side along a row.

In some exemplary and non-limiting aspects, the tray means may have a first tray end portion, a second tray end portion that is spaced away from the first tray end portion so as to define a tray width extending between the first tray end portion and the second tray end portion, and wherein the tray width may be configured to support at least twelve standard one width (1W) units side by side along the tray.

In various aspects, the modular fiber optic cassettes may comprise a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

In some exemplary and non-limiting aspects, each of the modules fiber optic cassettes may comprise four fiber optic plug receiving receptacle portions configured to be arranged side by side in a row along a front portion thereof for each standard width (1W) unit.

According to some aspects, the tray means may be configured to be mounted in a rack. According to some aspects, the tray means may be configured to be mounted in a standard U-space rack.

According to some aspects, the tray means may comprise a cassette fastening portion that may be configured to removably secure the tray to each modular fiber optic cassette. In some exemplary and non-limiting aspects, the cassette fastening portion may comprise a magnet.

In some exemplary and non-limiting aspects, the tray means may be configured to be removably secured to an elongate cable management bracket that may include a bracket width that fits in the standard one width (1W) unit. In some aspects, the elongate cable management bracket may include a cable management loop that may be configured to be positioned in front of and to a side of an optic plug receiving receptacle portion of a modular fiber optic cassette when the cable management loop is removably secured to the tray means.

In some exemplary and non-limiting aspects, the tray means may include a plurality of cassette engaging tray portions that are each configured to engage a tray engaging cassette portion of each modular fiber optic cassette.

In some exemplary and non-limiting aspects, the tray means may comprise a tray member that may be configured to fit in the standard U-space and support the plurality of different modular fiber optic cassette configurations in the standard U-space.

In some exemplary and non-limiting aspects, the plurality of different modular fiber optic cassette configurations may further comprise a fifth modular fiber optic cassette configuration that may include three modular 2W standard width unit size cassettes, which may be each arranged side by side of each other in a row along the tray such that a cassette side end portion of one of the three modular 2W standard width size cassettes adjacently faces a cassette side end portion of one of the other modular 2W standard width size cassette, and one modular 6W standard width unit size cassette which may be arranged side by side in a row along the tray with one of the three modular 2W standard width unit size cassettes, such that a cassette side end portion of the one modular 6W standard width unit size cassette may adjacently face a cassette side end portion of one of the other three modular 2W standard width unit size cassettes.

In accordance with various exemplary and non-limiting embodiments of the disclosure, a tray for providing a plurality of different modular fiber optic cassette configurations in a standard U-space fiber optic management system may comprise a tray means for supporting a plurality of different modular fiber optic cassette configurations The plurality of different modular fiber optic cassette configurations may include different sizes of modular fiber optic cassettes. Each of the different sizes of modular fiber optic cassettes may be configured to support a fiber optic receptable module that may be configured to fit in a standard one width (1W) unit. The plurality of different sizes of modular fiber optic cassettes include a 2W cassette size that may be configured to fit a standard two width (2W) unit relative to the standard one width (1W) unit, a 3W cassette size that may be configured to fit a standard three width (3W) unit relative to the standard one width (1W) unit, a 4W cassette size that may be configured to fit a standard four width (4W) unit relative to the standard one width (1W) unit, and a 6W cassette size that may be configured to fit a standard six width (6W) unit relative to the standard one width (1W) unit. The plurality of different modular fiber optic cassette configurations may comprise a first modular fiber optic cassette configuration that may include six modular 2W standard width unit size cassettes that are each arranged side by side of each other along the tray means such that a cassette side end portion of each modular 2W standard width unit size cassette adjacently faces a cassette side end portion of at least one other modular 2W standard width size cassette, a second modular fiber optic cassette configuration that may include four modular 3W standard width unit size cassettes that are each arranged side by side of each other in a row along the tray means such that a cassette side end portion of each modular 3W standard width unit size cassette adjacently faces a cassette side end portion of at least one other modular 3W standard width size cassette, a third modular fiber optic cassette configuration that may include three modular 4W standard width unit size cassettes that are each arranged side by side of each other in a row along the tray means such that a cassette side end portion of each modular 4W standard width size cassette adjacently faces a cassette side end portion of at least one other modular 4W standard width size cassette and a fourth modular fiber optic cassette configuration that may include two modular 6W standard width unit size cassettes that are each arranged side by side of each other in a row along the tray means such that a cassette side end portion of one of the two modular 6W standard width size cassettes adjacently faces a cassette side end portion of the other modular 6W standard width size cassette. The tray means may be configured to conform to the standard one width (1W) so as to support the modular 2W standard width unit size cassette, the modular 3W standard width unit size cassette, the modular 4W standard width unit size cassette, and the modular 6W standard width unit size cassette.

In some exemplary and non-limiting aspects, the tray means is for fitting in a standard U-space width. The tray means may comprise a tray member that may be configured to fit a plurality of different modular fiber optic cassette configurations in a standard U-space width.

In some non-limiting aspects, each of the plurality of different modular fiber optic cassette configurations include a plurality of different sizes of modular fiber optic cassettes.

In some exemplary and non-limiting aspects, the plurality of different modular fiber optic cassette configurations may further comprise a fifth modular fiber optic cassette configuration that may include three modular 2W standard width unit size cassettes, which are each arranged side by side of each other in a row along the tray means such that a cassette side end portion of one of the three modular 2W standard width size cassettes adjacently faces a cassette side end portion of one of the other modular 2W standard width size cassette, and one modular 6W standard width unit size cassette that is arranged side by side in a row along the tray means with one of the three modular 2W standard width unit size cassettes, such that a cassette side end portion of the one modular 6W standard width unit size cassette may adjacently face a cassette side end portion of one of the other three modular 2W standard width unit size cassettes.

In some exemplary and non-limiting aspects, the tray means may comprise a tray member that may be configured to be removable secured to each modular fiber optic cassette when the tray member supports the plurality of different modular fiber optic cassette configurations within a tray member width portion in a standard U-space fiber management system.

In some exemplary and non-limiting aspects, the tray means may include a plurality of selectively engaging cassette engaging portions that are configured to conform to the standard one width (1W) so as to support the modular 2W standard width unit size cassette, the modular 3W standard width unit size cassette, the modular 4W standard width unit size cassette, and the modular 6W standard width unit size cassette. In some aspects, the plurality of selectively engaging cassette engaging portions may comprise a plurality of slot portions that are each configured to releasably engage with a tab portion of the modular 2W standard width unit size cassette, the modular 3W standard width unit size cassette, the modular 4W standard width unit size cassette, and the modular 6W standard width unit size cassette. In some aspects, the plurality of slot portions include at least two slot portions that may be configured to releaseably engage with at least two corresponding tab portions of each of the modular 2W standard width unit size cassette, the modular 3W standard width unit size cassette, the modular 4W standard width unit size cassette, and the modular 6W standard width unit size cassette.

In some exemplary and non-limiting aspects, the tray means may include a plurality of selectively engaging cassette engaging portions that are spaced apart from one another so as to be configured to conform to the standard one width (1W) and support the modular 2W standard width unit size cassette, the modular 3W standard width unit size cassette, the modular 4W standard width unit size cassette, and the modular 6W standard width unit size cassette. In some aspects, the plurality of selectively engaging cassette engaging portions may comprise a plurality of slot portions that are each configured to releasably engage with a tab portion of each of the modular 2W standard width unit size cassette, the modular 3W standard width unit size cassette, the modular 4W standard width unit size cassette, and the modular 6W standard width unit size cassette. In some aspects, the plurality of slot portions may include at least two slot portions that are configured to releaseably engage with at least two corresponding tab portions of each of the modular 2W standard width unit size cassette, the modular 3W standard width unit size cassette, the modular 4W standard width unit size cassette, and the modular 6W standard width unit size cassette.

In some exemplary and non-limiting aspects, the tray means may comprise a tray member that may include a first tray member side end portion and a second tray member side end portion defining a tray member width portion extending between the first tray member side end portion and the second tray member side end portion, and where the tray member width portion may be configured to fit in a standard U-space width dimension.

In some exemplary and non-limiting aspects, the fiber optic receptable module may include a first module side end portion and a second module side end portion defining a module width portion extending between the first try end portion and second tray member end portion, and the module width portion may be configured to fit in the standard one width (1W) unit. In some aspects, the modular 2W standard width unit size cassette may include a first 2W cassette side end portion and a second 2W cassette side end portion defining a 2W standard cassette width unit extending between the first cassette side end portion and the second cassette side end portion that may be configured to fit the standard two width (2W) unit. In some aspects, the modular 3W standard width unit size cassette may include a first 3W cassette side end portion and a second 3W cassette side end portion defining a 3W standard cassette width unit extending between the first 3W cassette side end portion and the second 3W cassette side end portion that may be configured to fit the standard three width (3W) unit.

In some exemplary and non-limiting aspects, modular 4W standard width unit size cassette may include a first 4W cassette side end portion and a second 4W cassette side end portion defining a 4W standard cassette width unit extending between the first 4W cassette side end portion and the second 4W cassette side end portion that may be configured to fit the standard four width (4W) unit.

In some exemplary and non-limiting aspects, the modular 6W standard width unit size cassette may include a first 6W cassette side end portion and a second 6W cassette side end portion defining a 6W standard cassette width unit extending between the first 6W cassette side end portion and the second 6W cassette side end portion that may be configured to fit the standard six width (6W) unit.

In some exemplary and non-limiting aspects, the modular 2W standard width unit size cassette may be configured to fit two receptacle modules. In some aspects, the modular 3W standard width unit size cassette may be configured to fit three receptacle modules. In some aspects, the modular 4W standard width unit size cassette may be configured to fit four receptacle modules. In some aspects, the modular 6W standard width unit size cassette may be configured to fit six receptacle modules.

According to some aspects, the fiber optic receptable module may be configured to fit at least four fiber optic plug receiving receptacle portions.

According to some aspects, the fiber optic receptable module may be configured to fit at least four fiber optic plug receiving receptacle portions in the standard one width (1W) unit.

In some exemplary and non-limiting aspects, the standard one width (1W) unit is based on a standard LC Quad width unit that may be configured to fit four optical fiber connectors.

In some exemplary and non-limiting aspects, the standard one width (1W) unit is based on a standard SC Duplex width unit that may be configured to fit four optical fiber connectors.

In some exemplary and non-limiting aspects, the standard one width (1W) unit is based on a standard SC Duplex width unit that may be configured to fit an plurality of different type of LC, SC, and MPO connectors.

In some exemplary and non-limiting aspects, the tray means may comprise a row of cassette engaging portions that are spaced apart from one another so as to conform to the standard one width (1W) and support the modular 2W standard width unit size cassette, the modular 3W standard width unit size cassette, the modular 4W standard width unit size cassette, and the modular 6W standard width unit size cassette. In some aspects, the row of cassette engaging portions may comprise a row of slot portions that are each spaced apart from one another. In some aspects, the row of cassette engaging portions may comprise a first row of cassette engaging portions, and the tray means may include a second row of cassette engaging portion that is spaced away from the first row of cassette engaging portions. In some aspects, the first row of cassette engaging portion may comprise a first row of slot portions that are each configured to engage a tab portion of each modular cassette. In some aspects, the row of cassette engaging portions may comprise a front row of cassette engaging portions, and the tray may include a rear row of cassette engaging portion that is spaced away from the front row of cassette engaging portions. In some aspects, the front row of cassette engaging portion may comprise a front row of slot portions that are each configured to engage a tab portion of each modular cassette. In some aspects, the rear row of cassette engaging portion may comprise a rear row of aperture portions that are each configured to engage a moveable tab portion of each modular cassette that may be configured to move between a first position, where the tab portion may be configured to prevent each modular cassette from being released from the tray member, and a second position, where the tab portion may be configured to permit each modular cassette to be released from the tray member. In some aspects, the moveable tab portion may include a boss portion that may be configured to engage a corresponding aperture portion of the rear row of cassette engaging portion when the moveable tab portion is in the first position.

In some exemplary and non-limiting aspects, the tray means may include a cassette engaging shoulder that may be configured to fit a channel portion of each of the modular cassettes. In some aspects, the cassette engaging shoulder is located adjacent to a front end portion of the tray means such that the tray means may be configured to support each of the modular cassettes at a front location of the tray means.

In some exemplary and non-limiting aspects, the tray means may be configured to be slideably received in at least portion of a tray member receiving space of a case of a fiber optic management system.

In some exemplary and non-limiting aspects, each of the modular fiber optic cassettes include a cassette side end portion that is directly adjacent to a cassette side end portion of another module fiber optic cassette when each of the modular fiber optic cassettes are in the plurality of the plurality of different modular fiber optic cassette configurations.

In some exemplary and non-limiting aspects, each of the modular fiber optic cassettes include a cassette side end portion that is adjacent to a cassette side end portion of another module fiber optic cassette when each of the modular fiber optic cassettes are in the plurality of the plurality of different modular fiber optic cassette configurations.

In some exemplary and non-limiting aspects, each of the modular fiber optic cassettes include a cassette side end portion that touches a cassette side end portion of another module fiber optic cassette when each of the modular fiber optic cassettes are in the plurality of the plurality of different modular fiber optic cassette configurations.

In some exemplary and non-limiting aspects, the tray means has a tray member width that may be configured to support at least twelve standard one width (1W) units side by side along a row.

In some exemplary and non-limiting aspects, the tray means has a first tray member end portion, a second tray member end portion that is spaced away from the first tray member end portion so as to define a tray member width that extends between the first tray member end portion and the second tray member end portion, and wherein the tray member width may be configured to support at least twelve standard one width (1W) units side by side along the tray member.

In various aspects, each of the modular fiber optic cassettes may comprise a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

In some exemplary and non-limiting aspects, each of the modules fiber optic cassettes may comprise four fiber optic plug receiving receptacle portions configured to be arranged side by side in a row along a front portion thereof for each standard width (1W) unit.

In some exemplary and non-limiting aspects, the tray means may be configured to be mounted in a rack. In some aspects, the tray means may be configured to be mounted in a standard U-space rack.

In some exemplary and non-limiting aspects, the tray means may comprise a cassette fastening portion that may be configured to removably secure the tray means to each modular fiber optic cassette. In some aspects, the cassette fastening portion may comprise a magnet.

In some exemplary and non-limiting aspects, the tray means may be configured to be removable secured to an elongate cable management bracket that may include a bracket width that fits in the standard one width (1W) unit. In various aspects, the elongate cable management bracket may include a cable management loop that may be configured to be positioned in front of and to a side of an optic plug receiving receptacle portion of a modular fiber optic cassette when the cable management loop is removably secured to the tray means.

In some exemplary and non-limiting aspects, the tray means may comprise a tray member that may be configured to support the plurality of different modular fiber optic cassette configurations in a standard U-space width.

In accordance with various exemplary and non-limiting embodiments of the disclosure, a tray for providing a plurality of different modular fiber optic cassette configurations in a standard U-space fiber optic management system may comprise a tray means for supporting a plurality of different modular fiber optic cassette configurations. The plurality of different modular fiber optic cassette configurations may include different sizes of modular fiber optic cassettes. Each of the different sizes of modular fiber optic cassettes may be configured to support a fiber optic receptable module that may be configured to fit in a standard one width (1W) unit. The plurality of different sizes of modular fiber optic cassettes include a 2W cassette size that may be configured to fit a standard two width (2W) unit relative to the standard one width (1W) unit, a 3W cassette size that may be configured to fit a standard three width (3W) unit relative to the standard one width (1W) unit, a 4W cassette size that may be configured to fit a standard four width (4W) unit relative to the standard one width (1W) unit, and a 6W cassette size that may be configured to fit a standard six width (6W) unit relative to the standard one width (1W) unit. The tray means may be configured to conform to the standard one width (1W) so as to support the modular 2W standard width unit size cassette, the modular 3W standard width unit size cassette, the modular 4W standard width unit size cassette, and the modular 6W standard width unit size cassette.

In some exemplary and non-limiting aspects, the plurality of different modular fiber optic cassette configurations may include a first modular fiber optic cassette configuration that may include six modular 2W standard width unit size cassettes that are each arranged side by side of each other along the tray member such that a cassette side end portion of each modular 2W standard width unit size cassette adjacently faces a cassette side end portion of at least one other modular 2W standard width size cassette.

In some exemplary and non-limiting aspects, the plurality of different modular fiber optic cassette configurations may include a second modular fiber optic cassette configuration that may include four modular 3W standard width unit size cassettes that are each arranged side by side of each other in a row along the tray member such that a cassette side end portion of each modular 3W standard width unit size cassette adjacently faces a cassette side end portion of at least one other modular 3W standard width unit size cassette.

In some exemplary and non-limiting aspects, the plurality of different modular fiber optic cassette configurations may include a third modular fiber optic cassette configuration that may include three modular 4W standard width unit size cassettes that are each arranged side by side of each other in a row along the tray member such that a cassette side end portion of each modular 4W standard width unit size cassette adjacently faces a cassette side end portion of at least one other modular 4W standard width unit size cassette.

In some exemplary and non-limiting aspects, the plurality of different modular fiber optic cassette configurations may include a fourth modular fiber optic cassette configuration that may include two modular 6W standard width unit size cassettes that are each arranged side by side of each other in a row along the tray member such that a cassette side end portion of one of the two modular 6W standard width unit size cassettes adjacently faces a cassette side end portion of the other modular 6W standard width unit size cassette.

The foregoing and other features of construction and operation of the invention will be more readily understood and fully appreciated from the following detailed disclosure, taken in conjunction with accompanying drawings. Throughout the description, like reference numerals will refer to like parts in the various embodiments and drawing figures.

BRIEF DESCRIPTION OF THE DRAWINGS

FIG. 1 provides a right front perspective view of a modular fiber optic cassette and system mounted in a rack and in accordance with an illustrative embodiment of the present invention;

FIGS. 2A and 2B provide respectively a raised right front perspective view and a lowered right front perspective view of a modular fiber optic cassette in accordance with an illustrative embodiment of the present invention;

FIG. 3 provides a front plan view of a modular fiber optic cassette system mounted in a rack in accordance with an illustrative embodiment of the present invention;

FIGS. 4A through 4D provide raised right front perspective views of a tray populated with respectively six (6), four (4), three (3) and two (2) cassettes of different widths;

FIGS. 7A and 7B provide respectively a raised right front perspective view of a tray comprising a plurality modular fiber optic cassettes and a pair of cable management brackets and lowered right front perspective view of a cable management bracket in accordance with a second alternative illustrative embodiment of the present invention.

DETAILED DESCRIPTION OF THE ILLUSTRATIVE EMBODIMENTS

Figure 4A:
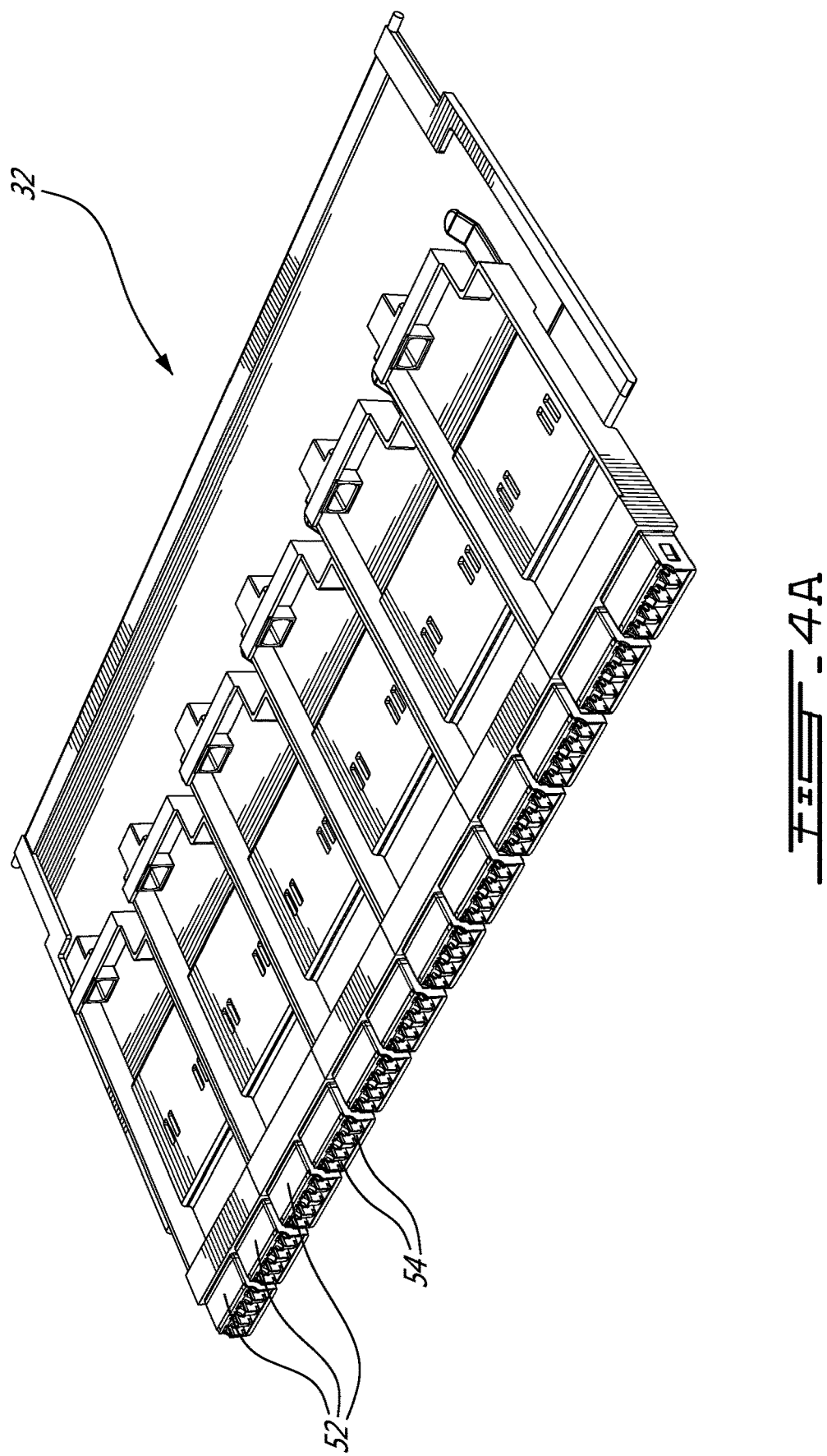

Referring now to FIG. 1, a modular cassette system, generally referred to using the reference numeral 10, will now be described. The modular cassette comprises a slideable tray 12 illustratively mounted within a case 14. The case 14 comprises a top wall 16, a bottom wall 18 and a pair of opposed side walls 20 defining a tray receiving space 22 therebetween. The case 14 is illustratively mounted to the rails 24 of a rack via a pair of mounting brackets 26 wherein one of the brackets 26 is attached to an outer surface 28 of a respective one of the sidewalls 20. The front edges 30 of the walls 16, 18, 20 define an opening via which the tray receiving space 22 can be accessed. In a particular illustrated embodiment the system 10 is shown for mounting in a 19" rack, however in a particular embodiment the system 10, with suitable modifications, may be mounted equally in a cross connect system, fiber bay or wall mount or the like.

Referring to FIGS. 2A and 2B in addition to FIG. 1, the tray 12 receives a plurality of removable fiber optic module or cassettes 32 arranged side by side on an upper surface 34 thereof. In a first embodiment each fiber optic cassette 32 is secured to the tray 12 using a fastener comprising tabs 36 of inverted "T" cross section which engage with respective slots 38 machined or otherwise formed in the tray 12. A flexible tab 40 is also provided which comprises a boss 42 that engages a respective aperture 44 machined or otherwise formed in the tray 12 when the tabs 36 are engaged within their respective slots 38, thereby releasably securing the cassette 32 to the tray 12. In order to better orient the cassette 36 on the tray during installation, the tray 12 comprises a raised shoulder 46 which is received within a channel 48 moulded or otherwise formed in an underside 50 of the cassette 32.

Still referring to FIGS. 2A and 2B, each cassette 32 illustratively comprises a plurality of receptacle modules 52 each comprising a plurality of receptacles 54, illustratively LC Quad type receptacles, arranged in a row and exposed along a forward edge 56 of the cassette 32. The cassette 32 also illustratively terminates a fiber optic cable 58, such as a trunk cable or the like, comprising a plurality of optic fibers at a multi-fiber connector receiving receptacle 60 on a rearward edge. Each optic fiber of the fiber optic cable 58 is interconnected with a respective one of the receptacles 54 using an optic fiber segment 62 comprising a receptacle end which is terminated by a plug 64. The segments 62, which are typically longer than the distance between the forward edge and the rearward edge, are typically looped several times within the cassette 32, for example in a serpentine or the like. A person of ordinary skill in the art will understand that an optic fiber terminated with a plug (not shown) inserted into a selected one of the receptacles 54 will interconnect the optic fiber with a selected optic fiber segment 62.

Referring now to FIG. 3 and FIGS. 4A through 4D, as discussed above, each cassette 32 illustratively comprises a plurality of receptacle modules 52 each comprising four (4) receptacles 54. It is foreseen to provide a set of four (4) different cassette sizes to accommodate terminating fiber optic cables comprising different number of optic fibers. Each of the different cassette sizes of the set is based on an integer multiple of a standardised pitch or width unit W wherein one standardized width unit accommodates a single receptacle module 52 comprising four (4) receptacles 54. Illustratively, a 2W cassette 32 comprising two (2) modules 52 accommodating eight (8) optic fibers (FIG. 4A) is provided, a 3W cassette 32 comprising three (3) modules 52 accommodating twelve (12) optic fibers (FIG. 4B) is provided, a 4W cassette 32 comprising four (4) modules 52 accommodating sixteen (16) optic fibers (FIG. 4C) is provided and a 6W cassette 32 comprising six (6) modules 52 accommodating twenty-four (24) optic fibers (FIG. 4D) is provided for. The 2W, 3W, 4W and 6W cassettes 32 are typically used only with like cassettes 32 as illustrated and such that respectively six (6), four (4), three (3) and two (2) cassettes fit snuggly side by side on the 12W tray, although in a particular embodiment cassettes 32 of different widths could be used together.

Although the present illustrative embodiment In a particular embodiment the pitch/width W is based on a LC Quad (SC Duplex) technology footprint comprising four (4) connectors, in an alternative embodiment the pitch/width W could be based on a different technology footprint, including SC Duplex comprising two (2) connectors and MPO type connectors comprising inter alia multiple optic fibers such as MPO-12, MPO-16 and MPO-24.

Still referring to FIGS. 3, 4A through 4D in addition to FIG. 1, a person of ordinary skill in the art will now understand that the disclosed system of cassettes 32 can be used to accommodate optic fiber cables 58 comprising different numbers of optic fibers 62 while ensuring that the same number of optic fibers 62 are accessible via the exposed receptacles 54.

Referring back to FIG. 1, the spacing between adjacent slots 38 as well as the spacing between adjacent apertures 44 conforms to the standardised width unit W and such that the 2W, 3W, 4W and 6W cassettes 32 can be readily accommodated on the tray.

Figure 5A:
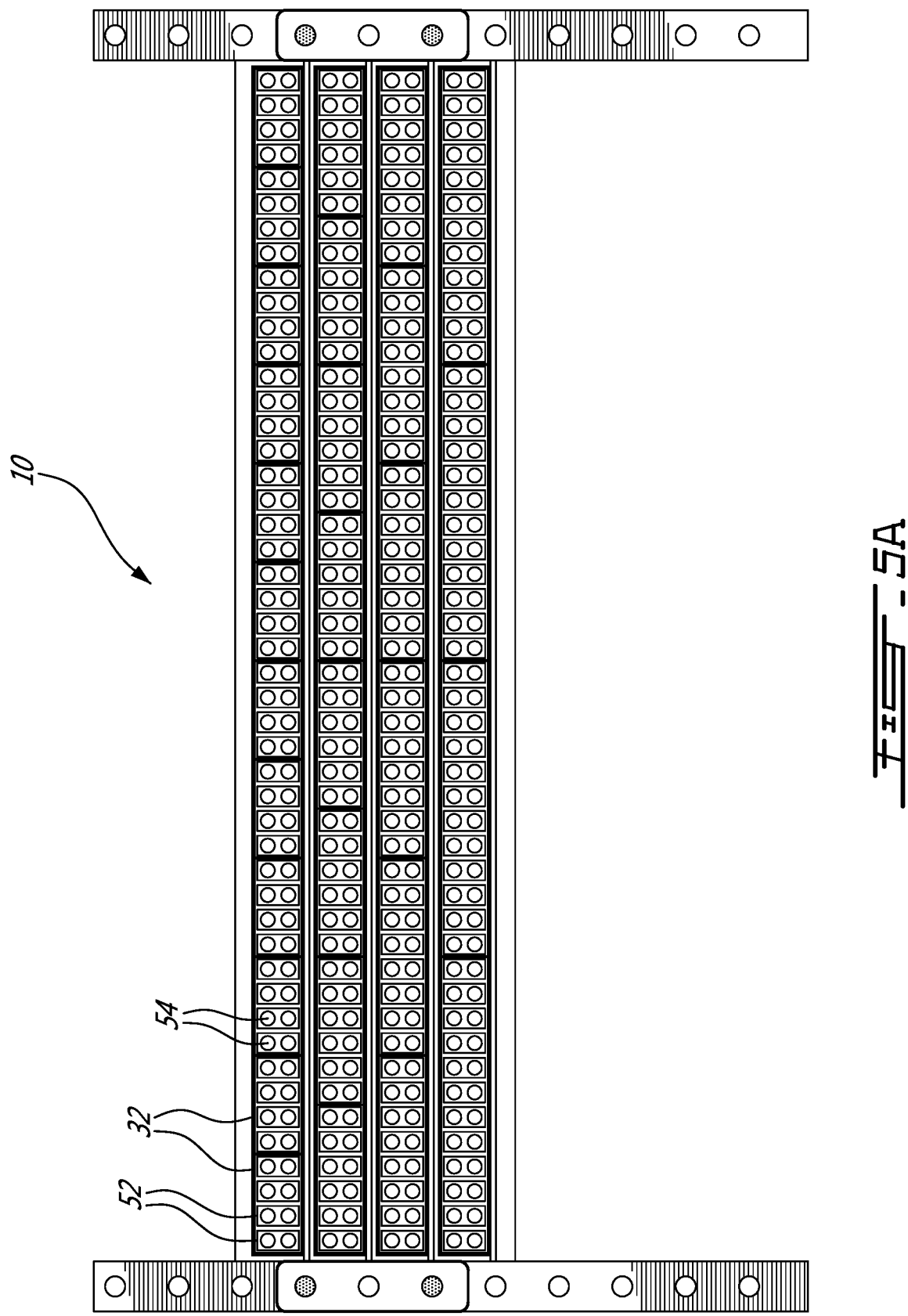
FIGS. 5A, 5B and 5C provide front plan views of a modular fiber optic cassette and system mounted in a rack respectively in accordance with first, second and third alternative embodiments of the present invention.

Referring now to FIG. 5A, in a first alternative embodiment of the system each receptacle modules 52 comprises a duplex type module arranged vertically. Additionally in a first cassette size four (4) of such duplex modules 52 are provided to provide for eight (8) receptacles 54 for terminating a fiber optic cable (not shown) comprised of eight (8) optic fibers. Similar to the first embodiment discussed above, sizes for twelve (12), sixteen (16) and twenty four (24) receptacles are also provided. Again, as the width of the cassettes is an integer multiple of the same pitch/width, cassettes of different widths can be used in the same tray system or in some cases on the same tray without modification or changing the density of the receptacles 54 for terminating optic fibres.

Figure 5B:
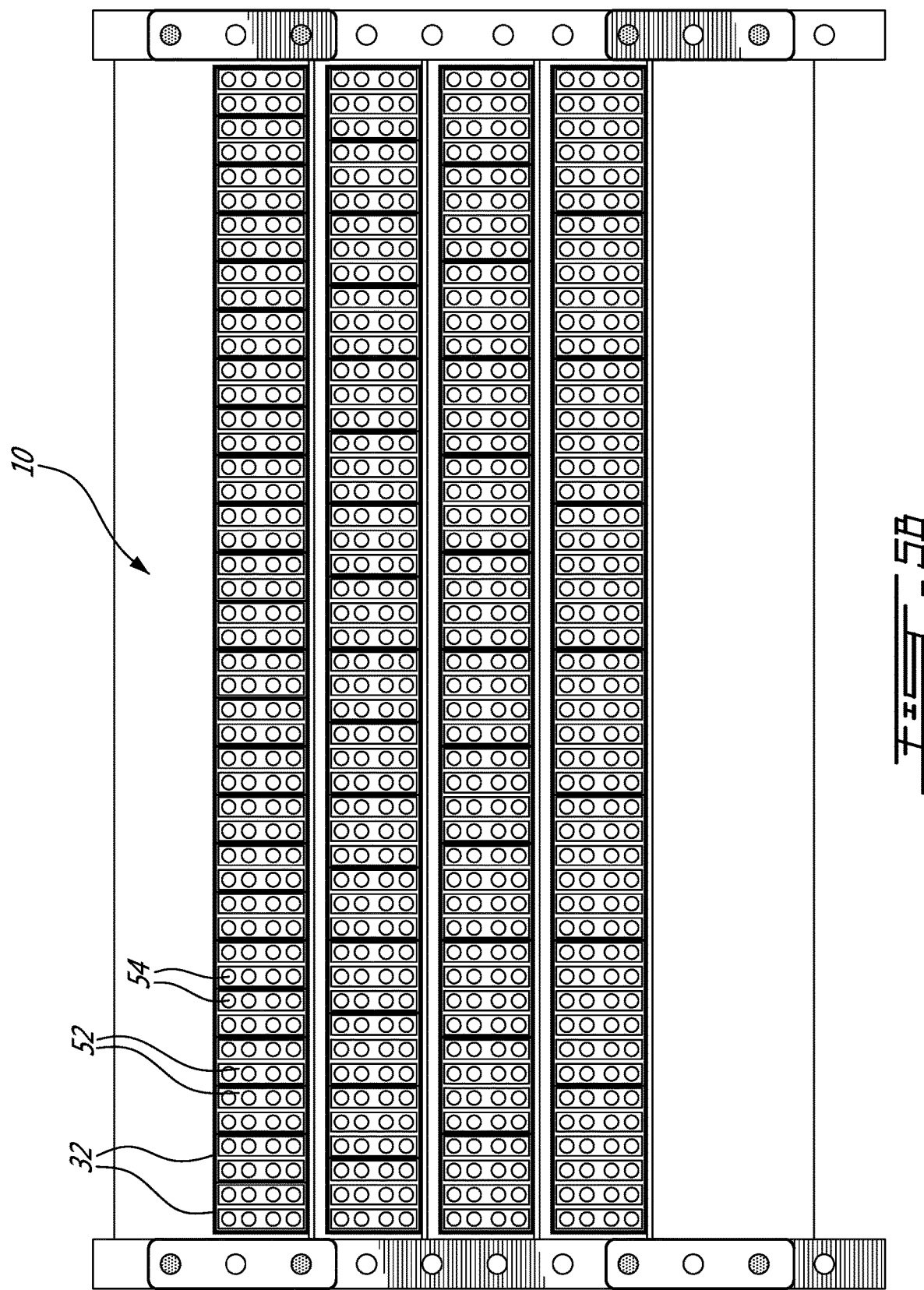

Referring now to FIG. 5B, in a second alternative embodiment of the system each receptacle modules 52 comprises a Quad type module arranged vertically. In a first cassette size two (2) of such quad modules 52 are provided to provide for eight (8) receptacles 54 for terminating a fiber optic cable (not shown) comprised of eight (8) optic fibers. Cassettes comprising three (3), four (4) and six (6) quad type modules 52 are provided to provide respectively twelve (12), sixteen (16) and twenty-four (24) receptacles. Again, as the width of the cassettes is an integer multiple of the same pitch/width, cassettes of different widths can be used in the same tray system or in some cases on the same tray without modification or changing the density of the receptacles 54 for terminating optic fibres.

Figure 5C:
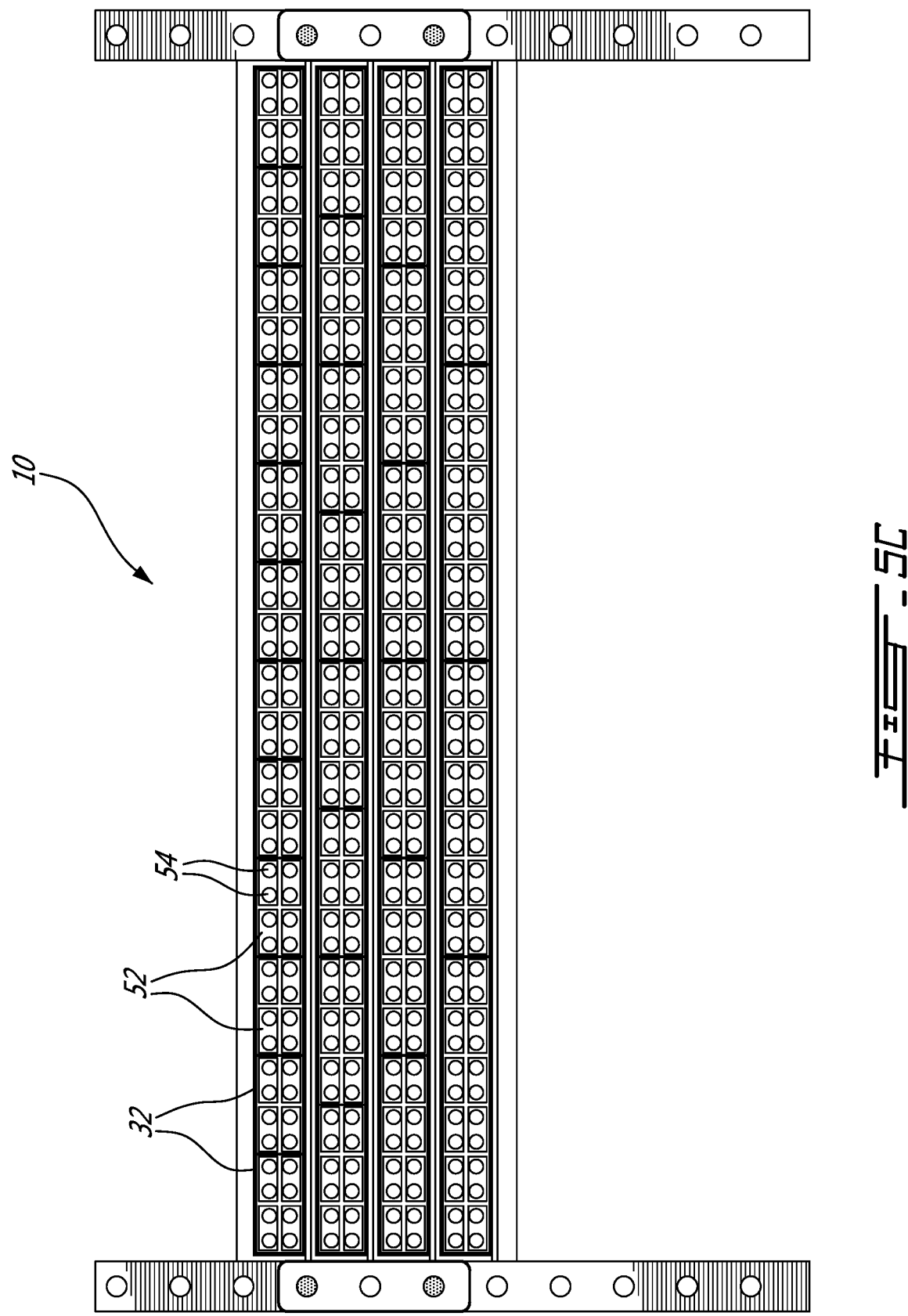

Referring now to FIG. 5C, in a third alternative embodiment of the system each receptacle modules 52 comprises a duplex type module arranged horizontally in two rows. In a first cassette size four (4) of such duplex modules 52 are provided to provide for eight (8) receptacles 54 for terminating a fiber optic cable (not shown) comprised of eight (8) optic fibers. Cassettes comprising six (6), eight (8) and twelve (12) duplex type modules 52 are provided to provide respectively twelve (12), sixteen (16) and twenty-four (24) receptacles. Again, as the width of the cassettes is an integer multiple of the same pitch/width, cassettes of different widths can be used in the same tray system or in some cases on the same tray without modification or changing the density of the receptacles 54 for terminating optic fibres.

Figure 6B:
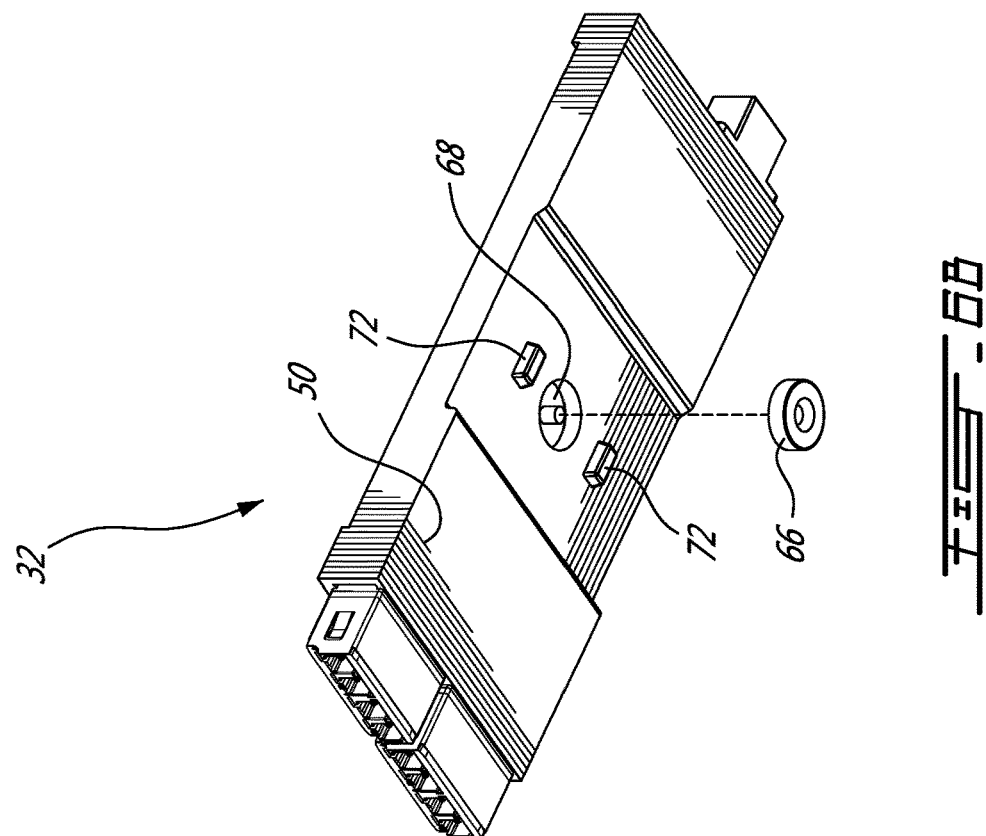
FIGS. 6A and 6B provide respectively a raised right front perspective view and a lowered right front perspective view of a modular fiber optic cassette in accordance with an alternative illustrative embodiment of the present invention.
Figure 6A:
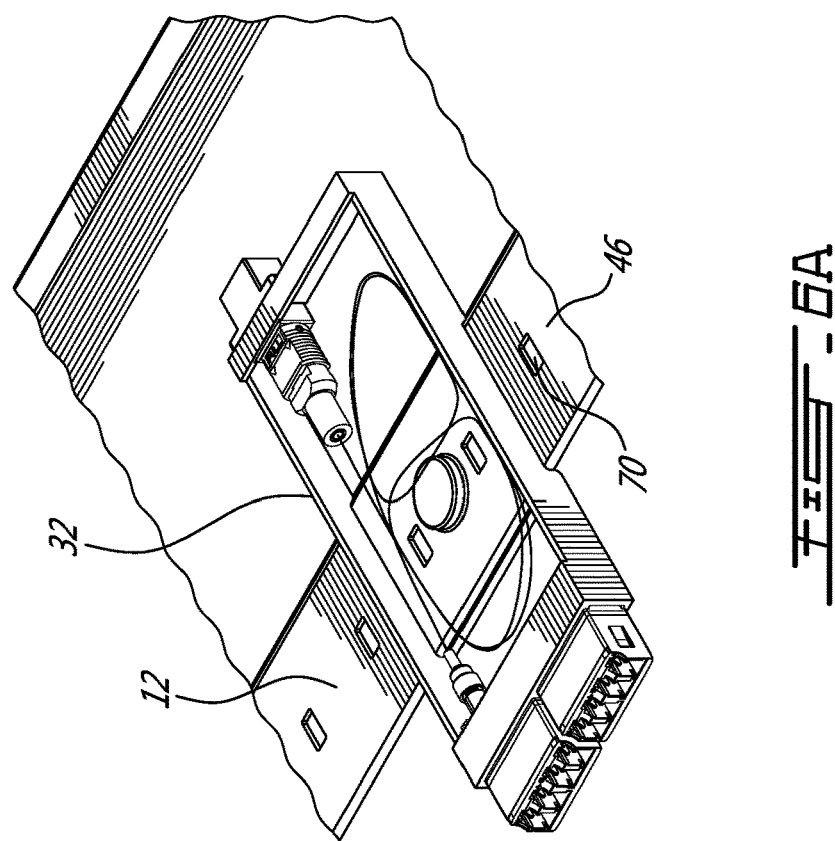

Referring now to FIGS. 6A and 6B in addition to FIG. 1, in an alternative embodiment of an assembly for securing the cassettes 32 to the tray 12 the tray 12 is manufactured from a ferrous material such as steel or the like and the fastener comprises a magnet 66 which is attracted to the tray and embedded or otherwise secured within a recess 68 formed in the underside 50 of the cassette 32. The tray 12, further comprises a series of spaced slots 70 arranged along the raised shoulder 46 which engage bosses 72 to ensure correct positioning of the cassettes 32 on the tray 12.

Figure 7A:
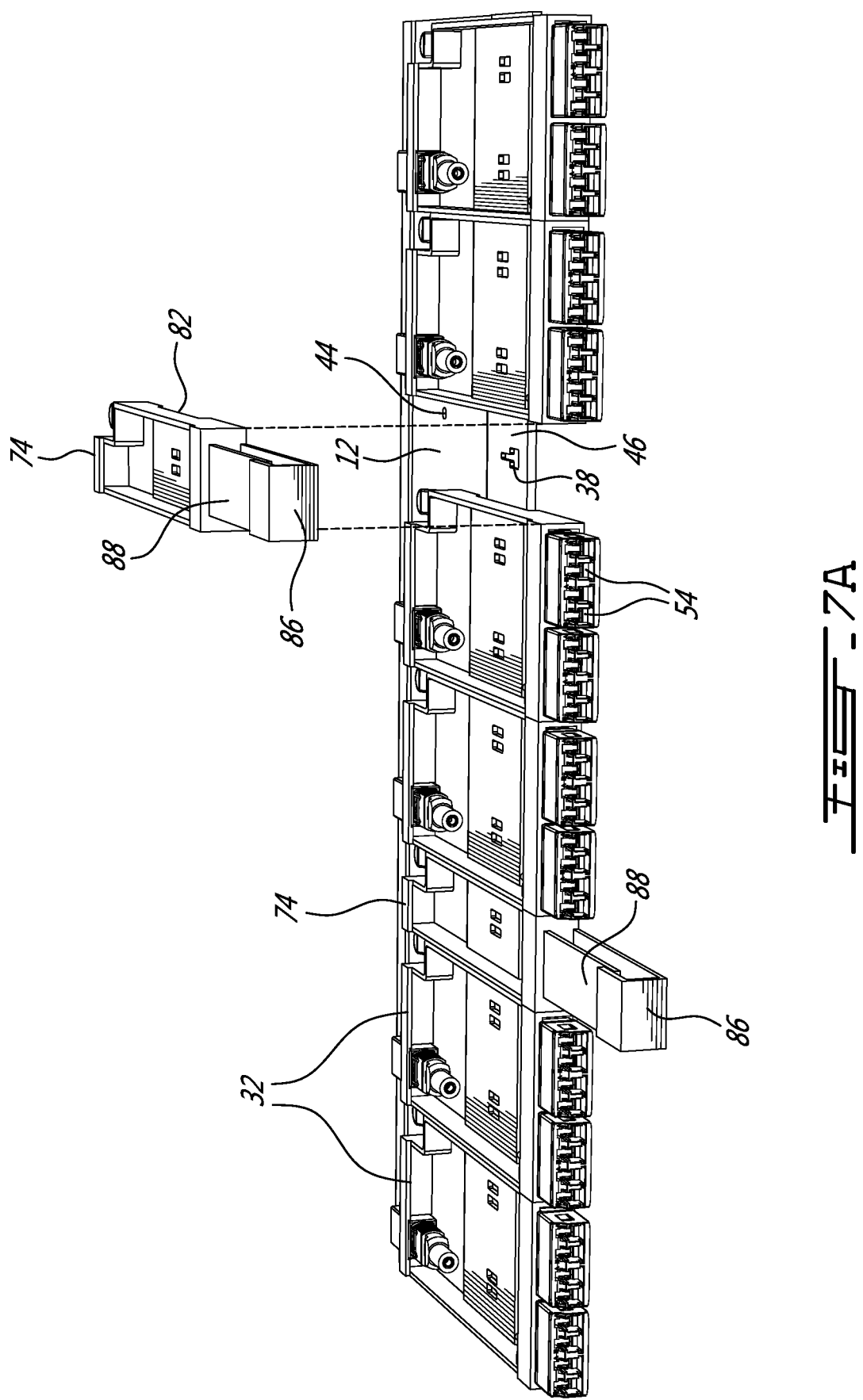

Referring now to FIG. 7A in a second alternative illustrative embodiment other equipment, such as a cable management bracket 74 can be provided with the same width W and such that they can be mounted to together with the cassettes 32 to the tray 12. In this regard, and with reference to FIG. 7B in addition to FIG. 7, the cable management bracket 74 is provided with tabs 76 comprising an inverted "T" cross section which engage with engage a slot 38 on the tray 12. A flexible tab 78 is provided which comprises a boss 80 that engages one of the apertures 44 in the tray 12 when the tab 76 is engaged within its respective slot 38, thereby releasable securing the cable management bracket 74 to the tray 12. In order to better orient the cable management bracket 74 on the tray during installation, the raised shoulder 46 of the tray 12 is received within a channel 82 moulded or otherwise formed in the underside 84 of the cable management bracket 74. Additionally, each cable management bracket 74 includes a cable management loop 86 for receiving a plurality of optic fibres (not shown) which are terminated at respective ones of the receptacles 54. A flexible strip 88 across the mouth of the cable management loop 86 is provided to releasably retain the plurality of optic fibers within the loop 86.

Although the present invention has been described hereinabove by way of specific embodiments thereof, it can be modified, without departing from the spirit and nature of the subject invention as defined in the appended claims.

The invention claimed is:

1. A tray for providing a plurality of different modular fiber optic cassette configurations in a standard U-space fiber optic management system comprising:
a tray means having a first tray side end portion and a second tray side end portion defining a tray width portion of a standard U-space fiber management system, the tray width portion extending between the first tray side end portion and the second tray side end portion;
wherein the tray width portion is configured to fit a standard U-space width dimension;
wherein the tray means is for fitting a plurality of different modular fiber optic cassette configurations in the tray width portion of the standard U-space fiber management system;
wherein each of the plurality of different modular fiber optic cassette configurations include a modular fiber optic cassette means for supporting a receptacle module having a first module side end portion and a second module side end portion defining a module width portion extending between the first tray end portion and second tray end portion;
wherein the module width portion is configured to fit in a standard one width (1W) unit;
wherein the modular fiber optic cassette means includes a first cassette side end portion and a second cassette side end portion defining a standard cassette width unit extending between the first cassette side end portion and the second cassette side end portion that comprises a standard two width (2W) unit, a standard three width (3W) unit, a standard four width (4W) unit, or a standard a standard six width (6W) unit relative to the standard one width (1W) unit;
wherein the receptacle module is configured to consist of only four fiber optic plug receiving receptacle portions in a standard one width (1W) unit;
wherein the plurality of different modular fiber optic cassette configurations comprise:
a first modular fiber optic cassette configuration that includes six modular two standard width unit (2W) cassettes that are each arranged side by side of each other along the tray such that a cassette side end portion of each modular two standard width (2W) cassette adjacently faces a cassette side end portion of at least one other modular two standard width (2W) cassette;
a second modular fiber optic cassette configuration that includes four modular three standard width unit (3W) cassettes that are each arranged side by side of each other in a row along the tray such that a cassette side end portion of each modular three standard width (3W) cassette adjacently faces a cassette side end portion of at least one other modular three standard width (3W) cassette;
a third modular fiber optic cassette configuration that includes three modular four standard width unit (4W) cassettes that are each arranged side by side of each other in a row along the tray such that a cassette side end portion of each modular four standard width (4W) cassette adjacently faces a cassette side end portion of at least one other modular four standard width (4W) cassette; and
a fourth modular fiber optic cassette configuration that includes two modular six standard width unit (6W) cassettes that are each arranged side by side of each other in a row along the tray such that a cassette side end portion of one of the two modular six standard width (6W) cassettes adjacently faces a cassette side end portion of the other modular six standard width (6W) cassette;
wherein each modular two standard width (2W) cassette is configured to fit two receptacle modules;
wherein each modular three standard width (3W) cassette is configured to fit three receptacle modules;
wherein each modular four standard width (4W) cassette is configured to fit four receptacle modules;
wherein each modular six standard width (6W) cassette is configured to fit six receptacle modules;
wherein the tray means is configured to be removably secured to the modular fiber optic cassette means when the tray fits the plurality of different modular fiber optic cassette configurations within the tray width portion in the standard U-space fiber management system; and
wherein the tray means includes a plurality of cassette engaging portions that are configured to conform to the standard one width (1W) so as to support the modular two standard width (2W) cassette, the modular three standard width (3W) cassette, the modular four standard width (4W) cassette, and the modular six standard width (6W) cassette.

2. The tray of claim 1, wherein the tray means comprises a tray member that is configured to fit the plurality of different modular fiber optic cassette configurations in the tray width portion of the standard U-space fiber management system.

3. The tray of claim 1, wherein the plurality of different modular fiber optic cassette configurations further comprise a fifth modular fiber optic cassette configuration that includes three modular two standard width unit (2W) cassettes, which are each arranged side by side of each other in a row along the tray such that a cassette side end portion of one of the three modular two standard width (2W) cassettes adjacently faces a cassette side end portion of one of the other modular two standard width (2W) cassette, and one modular six standard width unit (6W) cassette that is arranged side by side in a row along the tray with one of the three modular two standard width unit (2W) cassettes, such that a cassette side end portion of the one modular six standard width unit (6W) cassette adjacently faces a cassette side end portion of one of the other three modular two standard width unit (2W) cassettes.

4. The tray of claim 1, wherein the standard one width (1W) unit is based on a standard LC Quad width unit that is configured to fit four optical fiber connectors.

5. The tray of claim 1, wherein the standard one width (1W) unit is based on a standard SC Duplex width unit that is configured to fit four optical fiber connectors.

6. The tray of claim 1, wherein the standard one width (1W) unit is based on a standard SC Duplex width unit that is configured to fit an plurality of different type of LC, SC, and MPO connectors.

7. The tray of claim 1, wherein the plurality of cassette engaging portions of the tray are spaced apart from one another so as to conform to the standard one width (1W) and support the modular two standard width (2W) cassette, the modular three standard width (3W) cassette, the modular four standard width (4W) cassette, and the modular six standard width (6W) cassette.

8. The tray of claim 1, wherein the tray means includes a cassette engaging shoulder that is configured to fit a channel portion of the modular fiber optic cassette means.

9. The tray of claim 8, wherein the cassette engaging shoulder is located adjacent to a front end portion of the tray means such that the tray means is configured to support the modular fiber optic cassette means at a front location of the tray means.

10. The tray of claim 1, wherein the tray means is configured to be slideably received in at least portion of a tray receiving space of a case of a fiber optic management system.

11. The tray of claim 1, wherein the modular fiber optic cassette means comprises a plurality of modular fiber optic cassette means that include a cassette side end portion that is directly adjacent to a cassette side end portion of another module fiber optic cassette means when each of the plurality of modular fiber optic cassettes means are in the plurality of the plurality of different modular fiber optic cassette configurations.

12. The tray of claim 1, wherein the modular fiber optic cassette means comprises a plurality of modular fiber optic cassette means that include a cassette side end portion of one modular fiber optic cassette means that is adjacent to a cassette side end portion of another module fiber optic cassette when each of the plurality of modular fiber optic cassette means are in the plurality of the plurality of different modular fiber optic cassette configurations.

13. The tray of claim 1, wherein the modular fiber optic cassette means comprises a plurality of modular fiber optic cassette means that include a cassette side end portion of one modular fiber optic cassette means that touches a cassette side end portion of another module fiber optic cassette when each of the modular fiber optic cassettes means are in the plurality of the plurality of different modular fiber optic cassette configurations.

14. The tray of claim 1, wherein the tray means has a tray width that is configured to receive at least twelve standard one width (1W) units side by side along a row.

15. The tray of claim 1, wherein the tray means including first tray end portion, a second tray end portion spaced away from the first tray end portion so as to define a tray width extending between the first tray end portion and the second tray end portion, and wherein the tray width is configured to fit at least twelve standard one width (1W) units side by side along the tray means.

16. The tray of claim 1, wherein the modular fiber optic cassette means comprise a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

17. The tray of claim 1, wherein the four fiber optic plug receiving receptacle portions are configured to be arranged side by side in a row along a front portion thereof for each standard width (1W) unit.

18. The tray of claim 1, wherein the tray means is configured to be mounted in a rack.

19. The tray of claim 18, wherein the tray means is configured to be mounted in a standard U-space rack.

20. The tray of claim 1, wherein the tray means comprises a cassette fastening portion that is configured to removably secure the tray to the modular fiber optic cassette means.

21. The tray of claim 20, wherein the cassette fastening tray portion is configured to be disengaged from one of the plurality of modular fiber optic cassettes using a release portion positioned at a rear cassette portion of each of the plurality of modular fiber optic cassettes.

22. The tray of claim 21, wherein the release portion comprises a flexible tab.

23. The tray of claim 1, wherein the tray means is configured to be removably secured to an elongate cable management bracket that includes a bracket width that fits in the standard one width (1W) unit.

24. The tray of claim 23, wherein the elongate cable management bracket includes a cable management loop that is configured to be positioned in front of and to a side of an optic plug receiving receptacle portion of a modular cassette when the cable management loop is removably secured to the tray.

25. The tray of claim 1, wherein the tray means includes a plurality of cassette engaging tray portions that are each configured to engage a tray engaging cassette portion of each modular fiber optic cassette.

26. A tray for providing a plurality of different modular fiber optic cassette configurations in a fiber optic management system comprising:
a tray means for fitting a plurality of different modular fiber optic cassette configurations in a standard U-space;
wherein each of the plurality of different modular fiber optic cassette configurations include a plurality of different sizes of modular fiber optic cassettes;
wherein each of the plurality of different sizes of modular fiber optic cassettes is configured to support a fiber optic receptacle module that is configured to fit in a standard one width (1W) unit;
wherein the plurality of different sizes of modular fiber optic cassettes include a 2W cassette size that is configured to fit a standard two width (2W) unit relative to the standard one width (1W) unit, a 3W cassette size that is configured to fit a standard three width (3W) unit relative to the standard one width (1W) unit, a 4W cassette size that is configured to fit a standard four width (4W) unit relative to the standard one width (1W) unit, and a 6W cassette size that is configured to fit a standard six width (6W) unit relative to the standard one width (1W) unit;
wherein the 2W cassette size consists of only eight fiber optic plug receiving receptacle portions, the 3W cassette size consists of only twelve fiber optic plug receiving receptacle portions, the 4W cassette size consists of only sixteen fiber optic plug receiving receptacle portions, and the 6W cassette size consists of only twenty-four fiber optic plug receiving receptacle portions;
wherein the plurality of different modular fiber optic cassette configurations comprise:
a first modular fiber optic cassette configuration that includes six modular 2W standard width unit size cassettes that are each arranged side by side of each other along the tray such that a cassette side end portion of each modular 2W standard width unit size cassette adjacently faces a cassette side end portion of at least one other modular 2W standard width size cassette;
a second modular fiber optic cassette configuration that includes four modular 3W standard width unit size cassettes that are each arranged side by side of each other in a row along the tray such that a cassette side end portion of each modular 3W standard width size cassette adjacently faces a cassette side end portion of at least one other modular 3W standard width size cassette;

a third modular fiber optic cassette configuration that includes three modular 4W standard width unit size cassettes that are each arranged side by side of each other in a row along the tray such that a cassette side end portion of each modular 4W standard width size cassette adjacently faces a cassette side end portion of at least one other modular 4W standard width size cassette; and a fourth modular fiber optic cassette configuration that includes two modular 6W standard width unit size cassettes that are each arranged side by side of each other in a row along the tray such that a cassette side end portion of one of the two modular 6W standard width size cassettes adjacently faces a cassette side end portion of the other modular 6W standard width size cassette;

wherein the tray means is configured to be removably secured to each modular fiber optic cassette when the tray means fits the plurality of different modular fiber optic cassette configurations within a tray width portion in the standard U-space fiber optic management system; and wherein the tray means includes a plurality of cassette engaging portions that are configured to conform to the standard one width (1W) so as to support the modular 2W standard width unit size cassette, the modular 3W standard width unit size cassette, the modular 4W standard width unit size cassette, and the modular 6W standard width unit size cassette.

27. The tray of claim 26, wherein the tray means includes a first tray side end portion and a second tray side end portion defining a tray width portion extending between the first tray side end portion and the second tray side end portion, and where the tray width portion is configured to fit in a standard U-space width dimension.

28. The tray of claim 26, wherein the fiber optic receptacle module includes a first module side end portion and a second module side end portion defining a module width portion extending between the first try end portion and second tray end portion, and the module width portion is configured to fit in the standard one width (1 W) unit.

29. The tray of claim 26, wherein the modular 2W standard width unit size cassette includes a first 2W cassette side end portion and a second 2W cassette side end portion defining a 2W standard cassette width unit extending between the first cassette side end portion and the second cassette side end portion that is configured to fit the standard two width (2W) unit.

30. The tray of claim 26, wherein the modular 3W standard width unit size cassette includes a first 3W cassette side end portion and a second 3W cassette side end portion defining a 3W standard cassette width unit extending between the first 3W cassette side end portion and the second 3W cassette side end portion that is configured to fit the standard three width (3W) unit.

31. The tray of claim 26, wherein modular 4W standard width unit size cassette includes a first 4W cassette side end portion and a second 4W cassette side end portion defining a 4W standard cassette width unit extending between the first 4W cassette side end portion and the second 4W cassette side end portion that is configured to fit the standard four width (4W) unit.

32. The tray of claim 26, wherein the modular 6W standard width unit size cassette includes a first 6W cassette side end portion and a second 6W cassette side end portion defining a 6W standard cassette width unit extending between the first 6W cassette side end portion and the second 6W cassette side end portion that is configured to fit the standard six width (6W) unit.

33. The tray of claim 26, wherein the modular 2W standard width unit size cassette is configured to fit two receptacle modules.

34. The tray of claim 26, wherein the modular 3W standard width unit size cassette is configured to fit three receptacle modules.

35. The tray of claim 26, wherein the modular 4W standard width unit size cassette is configured to fit four receptacle modules.

36. The tray of claim 26, wherein the modular 6W standard width unit size cassette is configured to fit six receptacle modules.

37. The tray of claim 26, wherein the standard one width (1W) unit is based on a standard LC Quad width unit that is configured to fit four optical fiber connectors.

38. The tray of claim 26, wherein the standard one width (1W) unit is based on a standard SC Duplex width unit that is configured to fit four optical fiber connectors.

39. The tray of claim 26, wherein the standard one width (1W) unit is based on a standard SC Duplex width unit that is configured to fit a plurality of different type of LC, SC, and MPO connectors.

40. The tray of claim 26, wherein the plurality of cassette engaging portions of the tray means are spaced apart from one another so as to conform to the standard one width (1W) and support the modular 2W standard width unit size cassette, the modular 3W standard width unit size cassette, the modular 4W standard width unit size cassette, and the modular 6W standard width unit size cassette.

41. The tray of claim 26, wherein the tray means includes a cassette engaging shoulder that is configured to fit a channel portion of each of the modular fiber optic cassettes.

42. The tray of claim 26, wherein the cassette engaging shoulder is located adjacent to a front end portion of the tray means such that the tray means is configured to support each of the modular fiber optic cassettes at a front location of the tray.

43. The tray of claim 26, wherein the tray means is configured to be slideably received in at least portion of a tray receiving space of a case of a fiber optic management system.

44. The tray of claim 26, wherein each of the modular fiber optic cassettes include a cassette side end portion that is directly adjacent to a cassette side end portion of another module fiber optic cassette when each of the modular fiber optic cassettes are in the plurality of the plurality of different modular fiber optic cassette configurations.

45. The tray of claim 26, wherein each of the modular fiber optic cassettes include a cassette side end portion that is adjacent to a cassette side end portion of another module fiber optic cassette when each of the modular fiber optic cassettes are in the plurality of the plurality of different modular fiber optic cassette configurations.

46. The tray of claim 26, wherein each of the modular fiber optic cassettes include a cassette side end portion that is configured to touch a cassette side end portion of another module fiber optic cassette when each of the modular fiber optic cassettes are in the plurality of the plurality of different modular fiber optic cassette configurations.

47. The tray of claim 26, wherein the tray means has a tray width that is configured to receive at least twelve standard one width (1W) units side by side along a row.

48. The tray of claim 26, wherein the tray means has a first tray end portion, a second tray end portion that is spaced away from the first tray end portion so as to define a tray width extending between the first tray end portion and the second tray end portion, and wherein the tray width is configured to support at least twelve standard one width (1W) units side by side along the tray.

49. The tray of claim 26, wherein each of the modular fiber optic cassettes comprises a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

50. The tray of claim 26, wherein each of the modules fiber optic cassettes comprises four fiber optic plug receiving receptacle portions configured to be arranged side by side in a row along a front portion thereof for each standard width (1W) unit.

51. The tray of claim 26, wherein the tray means is configured to be mounted in a rack.

52. The tray of claim 26, wherein the tray means is configured to be mounted in a standard U-space rack.

53. The tray of claim 26, wherein the tray means comprises a cassette fastening portion that is configured to removably secure the tray to each modular fiber optic cassette.

54. The tray of claim 53, wherein the cassette fastening tray portion is configured to be disengaged from one of the plurality of modular fiber optic cassettes using a release portion positioned at a rear cassette portion of each of the plurality of modular fiber optic cassettes.

55. The tray of claim 54, wherein the release portion comprises a flexible tab.

56. The tray of claim 26, wherein the tray means is configured to be removably secured to an elongate cable management bracket that includes a bracket width that fits in the standard one width (1W) unit.

57. The tray of claim 56, wherein the elongate cable management bracket includes a cable management loop that is configured to be positioned in front of and to a side of an optic plug receiving receptacle portion of a modular fiber optic cassette when the cable management loop is removably secured to the tray means.

58. The tray of claim 26, wherein the tray means includes a plurality of cassette engaging tray portions that are each configured to engage a tray engaging cassette portion of each modular fiber optic cassette.

59. The tray of claim 26, wherein the tray means comprises a tray member that is configured to fit in the standard U-space and support the plurality of different modular fiber optic cassette configurations in the standard U-space.

60. The tray of claim 26, wherein the plurality of different modular fiber optic cassette configurations further comprise a fifth modular fiber optic cassette configuration that includes three modular 2W standard width unit size cassettes, which are each arranged side by side of each other in a row along the tray such that a cassette side end portion of one of the three modular 2W standard width size cassettes adjacently faces a cassette side end portion of one of the other modular 2W standard width size cassette, and one modular 6W standard width unit size cassette that is arranged side by side in a row along the tray with one of the three modular 2W standard width unit size cassettes, such that a cassette side end portion of the one modular 6W standard width unit size cassette adjacently faces a cassette side end portion of one of the other three modular 2W standard width unit size cassettes.

61. A tray for providing a plurality of different modular fiber optic cassette configurations in a standard U-space fiber optic management system comprising:
a tray means for supporting a plurality of different modular fiber optic cassette configurations;
wherein the plurality of different modular fiber optic cassette configurations include different sizes of modular fiber optic cassettes;
wherein each of the different sizes of modular fiber optic cassettes is configured to support a fiber optic receptacle module that is configured to fit in a standard one width (1W) unit;
wherein the plurality of different sizes of modular fiber optic cassettes include a 2W cassette size that is configured to fit a standard two width (2W) unit relative to the standard one width (1W) unit, a 3W cassette size that is configured to fit a standard three width (3W) unit relative to the standard one width (1W) unit, a 4W cassette size that is configured to fit a standard four width (4W) unit relative to the standard one width (1W) unit, and a 6W cassette size that is configured to fit a standard six width (6W) unit relative to the standard one width (1W) unit;
wherein the 2W cassette size is configured to consist of only eight fiber optic plug receiving receptacle portions, the 3W cassette size is configured to consist of only twelve fiber optic plug receiving receptacle portions, the 4W cassette size is configured to consist of only sixteen fiber optic plug receiving receptacle portions, and the 6W cassette size is configured to consist of only twenty-four fiber optic plug receiving receptacle portions;
wherein the plurality of different modular fiber optic cassette configurations comprise:
a first modular fiber optic cassette configuration that includes six modular 2W standard width unit size cassettes that are each arranged side by side of each other along the tray means such that a cassette side end portion of each modular 2W standard width unit size cassette adjacently faces a cassette side end portion of at least one other modular 2W standard width size cassette;
a second modular fiber optic cassette configuration that includes four modular 3W standard width unit size cassettes that are each arranged side by side of each other in a row along the tray means such that a cassette side end portion of each modular 3W standard width size cassette adjacently faces a cassette side end portion of at least one other modular 3W standard width size cassette;
a third modular fiber optic cassette configuration that includes three modular 4W standard width unit size cassettes that are each arranged side by side of each other in a row along the tray means such that a cassette side end portion of each modular 4W standard width size cassette adjacently faces a cassette side end portion of at least one other modular 4W standard width size cassette; and
a fourth modular fiber optic cassette configuration that includes two modular 6W standard width unit size cassettes that are each arranged side by side of each other in a row along the tray means such that a cassette side end portion of one of the two modular 6W standard width size cassettes adjacently faces a cassette side end portion of the other modular 6W standard width size cassette; and wherein the tray means is configured to conform to the standard one width (1W) so as to support the modular 2W standard width unit size cassette, the modular 3W standard width unit size cassette, the modular 4W standard width unit size cassette, and the modular 6W standard width unit size cassette.

62. The tray of claim 61, wherein the tray means is for fitting in a standard U-space width.

63. The tray of claim 61, wherein the tray means comprises a tray member that is configured to fit a plurality of different modular fiber optic cassette configurations in a standard U-space width.

64. The tray of claim 61, wherein each of the plurality of different modular fiber optic cassette configurations include a plurality of different sizes of modular fiber optic cassettes.

65. The tray of claim 61, wherein the plurality of different modular fiber optic cassette configurations further comprise a fifth modular fiber optic cassette configuration that includes three modular 2W standard width unit size cassettes, which are each arranged side by side of each other in a row along the tray means such that a cassette side end portion of one of the three modular 2W standard width size cassettes adjacently faces a cassette side end portion of one of the other modular 2W standard width size cassette, and one modular 6W standard width unit size cassette that is arranged side by side in a row along the tray means with one of the three modular 2W standard width unit size cassettes, such that a cassette side end portion of the one modular 6W standard width unit size cassette adjacently faces a cassette side end portion of one of the other three modular 2W standard width unit size cassettes.

66. The tray of claim 61, wherein the tray means comprises a tray member that is configured to be removably secured to each modular fiber optic cassette when the tray member supports the plurality of different modular fiber optic cassette configurations within a tray member width portion in a standard U-space fiber management system.

67. The tray of claim 61, wherein the tray means includes a plurality of selectively engaging cassette engaging portions that are configured to conform to the standard one width (1W) so as to support the modular 2W standard width unit size cassette, the modular 3W standard width unit size cassette, the modular 4W standard width unit size cassette, and the modular 6W standard width unit size cassette.

68. The tray of claim 61, wherein the plurality of selectively engaging cassette engaging portions comprises a plurality of slot portions that are each configured to releasably engage with a tab portion of the modular 2W standard width unit size cassette, the modular 3W standard width unit size cassette, the modular 4W standard width unit size cassette, and the modular 6W standard width unit size cassette.

69. The tray of claim 61, wherein the plurality of slot portions include at least two slot portions that are configured to releaseably engage with at least two corresponding tab portions of each of the modular 2W standard width unit size cassette, the modular 3W standard width unit size cassette, the modular 4W standard width unit size cassette, and the modular 6W standard width unit size cassette.

70. The tray of claim 61, wherein the tray means includes a plurality of selectively engaging cassette engaging portions that are spaced apart from one another so as to be configured to conform to the standard one width (1W) and support the modular 2W standard width unit size cassette, the modular 3W standard width unit size cassette, the modular 4W standard width unit size cassette, and the modular 6W standard width unit size cassette.

71. The tray of claim 70, wherein the plurality of selectively engaging cassette engaging portions comprises a plurality of slot portions that are each configured to releasably engage with a tab portion of each of the modular 2W standard width unit size cassette, the modular 3W standard width unit size cassette, the modular 4W standard width unit size cassette, and the modular 6W standard width unit size cassette.

72. The tray of claim 71, wherein the plurality of slot portions include at least two slot portions that are configured to releaseably engage with at least two corresponding tab portions of each of the modular 2W standard width unit size cassette, the modular 3W standard width unit size cassette, the modular 4W standard width unit size cassette, and the modular 6W standard width unit size cassette.

73. The tray of claim 61, wherein the tray means comprises a tray member that includes a first tray member side end portion and a second tray member side end portion defining a tray member width portion extending between the first tray member side end portion and the second tray member side end portion, and where the tray member width portion is configured to fit in a standard U-space width dimension.

74. The tray of claim 61, wherein the fiber optic receptacle module includes a first module side end portion and a second module side end portion defining a module width portion extending between the first try end portion and second tray member end portion, and the module width portion is configured to fit in the standard one width (1 W) unit.

75. The tray of claim 61, wherein modular 2W standard width unit size cassette includes a first 2W cassette side end portion and a second 2W cassette side end portion defining a 2W standard cassette width unit extending between the first cassette side end portion and the second cassette side end portion that is configured to fit the standard two width (2W) unit.

76. The tray of claim 61, wherein the modular 3W standard width unit size cassette includes a first 3W cassette side end portion and a second 3W cassette side end portion defining a 3W standard cassette width unit extending between the first 3W cassette side end portion and the second 3W cassette side end portion that is configured to fit the standard three width (3W) unit.

77. The tray of claim 61, wherein modular 4W standard width unit size cassette includes a first 4W cassette side end portion and a second 4W cassette side end portion defining a 4W standard cassette width unit extending between the first 4W cassette side end portion and the second 4W cassette side end portion that is configured to fit the standard four width (4W) unit.

78. The tray of claim 61, wherein the modular 6W standard width unit size cassette includes a first 6W cassette side end portion and a second 6W cassette side end portion defining a 6W standard cassette width unit extending between the first 6W cassette side end portion and the second 6W cassette side end portion that is configured to fit the standard six width (6W) unit.

79. The tray of claim 61, wherein the modular 2W standard width unit size cassette is configured to fit two receptacle modules.

80. The tray of claim 61, wherein the modular 3W standard width unit size cassette is configured to fit three receptacle modules.

81. The tray of claim 61, wherein the modular 4W standard width unit size cassette is configured to fit four receptacle modules.

82. The tray of claim 61, wherein the modular 6W standard width unit size cassette is configured to fit six receptacle modules.

83. The tray of claim 61, wherein the standard one width (1W) unit is based on a standard LC Quad width unit that is configured to fit four optical fiber connectors.

84. The tray of claim 61, wherein the standard one width (1W) unit is based on a standard SC Duplex width unit that is configured to fit four optical fiber connectors.

85. The tray of claim 61, wherein the standard one width (1W) unit is based on a standard SC Duplex width unit that is configured to fit an plurality of different type of LC, SC, and MPO connectors.

86. The tray of claim 61, wherein the tray means comprises a row of cassette engaging portions that are spaced apart from one another so as to conform to the standard one width (1W) and support the modular 2W standard width unit size cassette, the modular 3W standard width unit size cassette, the modular 4W standard width unit size cassette, and the modular 6W standard width unit size cassette.

87. The tray of claim 86, wherein the row of cassette engaging portions comprises a row of slot portions that are each spaced apart from one another.

88. The tray of claim 86, wherein the row of cassette engaging portions comprises a first row of cassette engaging portions, and the tray means includes a second row of cassette engaging portions that is spaced away from the first row of cassette engaging portions.

89. The tray of claim 88, wherein the first row of cassette engaging portions comprises a first row of slot portions that are each configured to engage a tab portion of each modular fiber optic cassette.

90. The tray of claim 86, wherein the row of cassette engaging portions comprises a front row of cassette engaging portions, and the tray includes a rear row of cassette engaging portions that is spaced away from the front row of cassette engaging portions.

91. The tray of claim 90, wherein the front row of cassette engaging portions comprises a front row of slot portions that are each configured to engage a tab portion of each modular fiber optic cassette.

92. The tray of claim 91, wherein the rear row of cassette engaging portions comprises a rear row of aperture portions that are each configured to engage a moveable tab portion of each modular fiber optic cassette that is configured to move between a first position, where the tab portion is configured to prevent each modular fiber optic cassette from being released from the tray member, and a second position, where the tab portion is configured to permit each modular fiber optic cassette to be released from the tray member.

93. The tray of claim 92, wherein the moveable tab portion includes a boss portion that is configured to engage a corresponding aperture portion of the rear row of cassette engaging portions when the moveable tab portion is in the first position.

94. The tray of claim 61, wherein the tray means includes a cassette engaging shoulder that is configured to fit a channel portion of each of the modular fiber optic cassettes.

95. The tray of claim 94, wherein the cassette engaging shoulder is located adjacent to a front end portion of the tray means such that the tray means is configured to support each of the modular fiber optic cassettes at a front location of the tray means.

96. The tray of claim 61, wherein the tray means is configured to be slideably received in at least portion of a tray member receiving space of a case of a fiber optic management system.

97. The tray of claim 61, wherein each of the modular fiber optic cassettes include a cassette side end portion that is directly adjacent to a cassette side end portion of another module fiber optic cassette when each of the modular fiber optic cassettes are in the plurality of the plurality of different modular fiber optic cassette configurations.

98. The tray of claim 61, wherein each of the modular fiber optic cassettes include a cassette side end portion that is adjacent to a cassette side end portion of another module fiber optic cassette when each of the modular fiber optic cassettes are in the plurality of the plurality of different modular fiber optic cassette configurations.

99. The tray of claim 61, wherein each of the modular fiber optic cassettes include a cassette side end portion that touches a cassette side end portion of another module fiber optic cassette when each of the modular fiber optic cassettes are in the plurality of the plurality of different modular fiber optic cassette configurations.

100. The tray of claim 61, wherein the tray means has a tray member width that is configured to support at least twelve standard one width (1W) units side by side along a row.

101. The tray of claim 61, wherein the tray means has a first tray member end portion, a second tray member end portion that is spaced away from the first tray member end portion so as to define a tray member width that extends between the first tray member end portion and the second tray member end portion, and wherein the tray member width is configured to support at least twelve standard one width (1W) units side by side along the tray member.

102. The tray of claim 61, wherein each of the modular fiber optic cassettes comprises a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

103. The tray of claim 61, wherein each of the modules fiber optic cassettes comprises four fiber optic plug receiving receptacle portions configured to be arranged side by side in a row along a front portion thereof for each standard width (1W) unit.

104. The tray of claim 61, wherein the tray means is configured to be mounted in a rack.

105. The tray of claim 61, wherein the tray means is configured to be mounted in a standard U-space rack.

106. The tray of claim 61, wherein the tray means comprises a cassette fastening portion that is configured to removably secure the tray means to each modular fiber optic cassette.

107. The tray of claim 106, wherein the cassette fastening tray portion is configured to be disengaged from one of the plurality of modular fiber optic cassettes using a release portion positioned at a rear cassette portion of each of the plurality of modular fiber optic cassettes.

108. The tray of claim 107, wherein the release portion comprises a flexible tab.

109. The tray of claim 107, wherein the elongate cable management bracket includes a cable management loop that is configured to be positioned in front of and to a side of an optic plug receiving receptacle portion of a modular fiber optic cassette when the cable management loop is removably secured to the tray means.

110. The tray of claim 61, wherein the tray means is configured to be removably secured to an elongate cable management bracket that includes a bracket width that fits in the standard one width (1W) unit.

111. The tray of claim 61, wherein the tray means comprises a tray member that is configured to support the plurality of different modular fiber optic cassette configurations in a standard U-space width.

112. A tray for providing a plurality of different modular fiber optic cassette configurations in a standard U-space fiber optic management system comprising:
a tray means for supporting a plurality of different modular fiber optic cassette configurations;
wherein the plurality of different modular fiber optic cassette configurations include different sizes of modular fiber optic cassettes;
wherein each of the different sizes of modular fiber optic cassettes is configured to support a fiber optic receptacle module that is configured to fit in a standard one width (1W) unit;
wherein the plurality of different sizes of modular fiber optic cassettes include a 2W cassette size that is configured to fit a standard two width (2W) unit relative to the standard one width (1W) unit, a 3W cassette size that is configured to fit a standard three width (3W) unit relative to the standard one width (1W) unit, a 4W cassette size that is configured to fit a standard four width (4W) unit relative to the standard one width (1W) unit, and a 6W cassette size that is configured to fit a standard six width (6W) unit relative to the standard one width (1W) unit;
wherein the 2W cassette size is configured to consist of only eight fiber optic plug receiving receptacle portions, the 3W cassette size is configured to consist of only twelve fiber optic plug receiving receptacle portions, the 4W cassette size is configured to consist of only sixteen fiber optic plug receiving receptacle portions, and the 6W cassette size is configured to consist of only twenty-four fiber optic plug receiving receptacle portions; and
wherein the tray means is configured to conform to the standard one width (1W) so as to support the modular 2W standard width unit size cassette, the modular 3W standard width unit size cassette, the modular 4W standard width unit size cassette, and the modular 6W standard width unit size cassette.

113. The tray of claim 112, wherein the plurality of different modular fiber optic cassette configurations includes a first modular fiber optic cassette configuration that includes six modular 2W standard width unit size cassettes that are each arranged side by side of each other along the tray member such that a cassette side end portion of each modular 2W standard width unit size cassette adjacently faces a cassette side end portion of at least one other modular 2W standard width size cassette.

114. The tray of claim 113, wherein the plurality of different modular fiber optic cassette configurations include a second modular fiber optic cassette configuration that includes four modular 3W standard width unit size cassettes that are each arranged side by side of each other in a row along the tray member such that a cassette side end portion of each modular 3W standard width unit size cassette adjacently faces a cassette side end portion of at least one other modular 3W standard width unit size cassette.

115. The tray of claim 114, wherein the plurality of different modular fiber optic cassette configurations include a third modular fiber optic cassette configuration that includes three modular 4W standard width unit size cassettes that are each arranged side by side of each other in a row along the tray member such that a cassette side end portion of each modular 4W standard width unit size cassette adjacently faces a cassette side end portion of at least one other modular 4W standard width unit size cassette.

116. The tray of claim 115, wherein the plurality of different modular fiber optic cassette configurations include a fourth modular fiber optic cassette configuration that includes two modular 6W standard width unit size cassettes that are each arranged side by side of each other in a row along the tray member such that a cassette side end portion of one of the two modular 6W standard width unit size cassettes adjacently faces a cassette side end portion of the other modular 6W standard width unit size cassette.

117. The tray of claim 112, wherein the cassette fastening tray portion is configured to be disengaged from one of the plurality of modular fiber optic cassettes using a release portion positioned at a rear cassette portion of each of the plurality of modular fiber optic cassettes.

118. The tray of claim 112, wherein the release portion comprises a flexible tab.

119. The tray of claim 118, wherein the plurality of different modular fiber optic cassette configurations include a fourth modular fiber optic cassette configuration that includes two modular 6W standard width unit size cassettes that are each arranged side by side of each other in a row along the tray member such that a cassette side end portion of one of the two modular 6W standard width unit size cassettes adjacently faces a cassette side end portion of the other modular 6W standard width unit size cassette.

120. The tray of claim 115, wherein the cassette fastening tray portion is configured to be disengaged from one of the plurality of modular fiber optic cassettes using a release portion positioned at a rear cassette portion of each of the plurality of modular fiber optic cassettes.

121. The tray of claim 115, wherein the release portion comprises a flexible tab.

* * * * *